(12) United States Patent
Ohki

(10) Patent No.: US 10,746,874 B2
(45) Date of Patent: Aug. 18, 2020

(54) RANGING MODULE, RANGING SYSTEM, AND METHOD OF CONTROLLING RANGING MODULE

(71) Applicant: Sony Corporation, Tokyo (JP)

(72) Inventor: Mitsuharu Ohki, Tokyo (JP)

(73) Assignee: Sony Corporation, Tokyo (JP)

(*) Notice: Subject to any disclaimer, the term of this patent is extended or adjusted under 35 U.S.C. 154(b) by 96 days.

(21) Appl. No.: 15/746,165

(22) PCT Filed: Nov. 9, 2016

(86) PCT No.: PCT/JP2016/083161
§ 371 (c)(1),
(2) Date: Jan. 19, 2018

(87) PCT Pub. No.: WO2017/145450
PCT Pub. Date: Aug. 31, 2017

(65) Prior Publication Data
US 2018/0348369 A1    Dec. 6, 2018

(30) Foreign Application Priority Data
Feb. 23, 2016  (JP) .................. 2016-032168

(51) Int. Cl.
*G01C 3/08* (2006.01)
*G01S 17/08* (2006.01)
(Continued)

(52) U.S. Cl.
CPC .......... *G01S 17/08* (2013.01); *B60W 30/09* (2013.01); *B60W 30/16* (2013.01); *G01S 7/4861* (2013.01);
(Continued)

(58) Field of Classification Search
None
See application file for complete search history.

(56) References Cited

U.S. PATENT DOCUMENTS 7,362,419 B2 * 4/2008 Kurihara ............... G01S 7/493
356/4.07
2011/0037969 A1  2/2011  Spickermann et al.
(Continued)

FOREIGN PATENT DOCUMENTS

JP   2011-185664 A   9/2011
JP   2011-217206 A   10/2011
(Continued)

OTHER PUBLICATIONS

International Search Report and English translation thereof dated Feb. 14, 2017 in connection with International Application No. PCT/JP2016/083161.
(Continued)

*Primary Examiner* — Isam A Alsomiri
*Assistant Examiner* — Amir J Askarian
(74) *Attorney, Agent, or Firm* — Wolf, Greenfield & Sacks, P.C.

(57) ABSTRACT

A distance is accurately measured by a ranging system that performs ranging by a ToF method.

A ranging module includes a light receiving unit, a determination unit, and a ranging unit. The light receiving unit receives reflection light from an object and detects a received light quantity of the reflection light within a predetermined detection period every time the predetermined detection period elapses. The determination unit determines whether the object is moved during each of the predetermined detection periods. The ranging unit measures a distance to the object on the basis of received light quantity within a predetermined detection period during which it is determined that the object is not moved.

6 Claims, 32 Drawing Sheets

(51) Int. Cl.

| | | |
|---|---|---|
| *G01S 17/89* | (2020.01) | |
| *G01S 7/4914* | (2020.01) | |
| *G01S 7/497* | (2006.01) | |
| *G01S 7/4915* | (2020.01) | |
| *G01S 17/36* | (2006.01) | |
| *G01S 17/931* | (2020.01) | |
| *B60W 30/09* | (2012.01) | |
| *B60W 30/16* | (2020.01) | |
| *G01S 7/4861* | (2020.01) | |

(52) U.S. Cl.
CPC ............ *G01S 7/497* (2013.01); *G01S 7/4914* (2013.01); *G01S 7/4915* (2013.01); *G01S 17/36* (2013.01); *G01S 17/89* (2013.01); *G01S 17/931* (2020.01)

(56) References Cited

U.S. PATENT DOCUMENTS

| | | |
|---|---|---|
| 2013/0020471 A1 | 1/2013 | Korekado et al. |
| 2014/0375762 A1 | 12/2014 | Ohki |
| 2018/0189591 A1 | 7/2018 | Ohki et al. |
| 2018/0292206 A1 | 10/2018 | Ohki |
| 2018/0329063 A1* | 11/2018 | Takemoto ............. G01S 7/4865 |

FOREIGN PATENT DOCUMENTS

| | | | |
|---|---|---|---|
| JP | 2015-049148 A | 3/2015 | |
| JP | 2015-221642 A | 12/2015 | |
| JP | 2017083243 A * | 5/2017 | |
| WO | WO-2015030107 A1 * | 3/2015 | ............... G01C 3/08 |

OTHER PUBLICATIONS

Li, L., Time-of-Flight Camera—An Introduction, Sensing Solutions, Texas Instruments, Technical White Paper, SLOA190B—Jan. 2014, Revised May 2014, 10 pages.

International Written Opinion dated Feb. 14, 2017 in connection with International Application No. PCT/JP2016/083161, and English translation thereof.

International Preliminary Report on Patentability dated Sep. 7, 2018 in connection with International Application No. PCT/JP2016/083161, and English translation thereof.

* cited by examiner

FIG. 8

| (X COORDINATE, y COORDINATE) | IMAGE DATA | |
|---|---|---|
| | Q1 | Q2 |
| (0, 0) | 10 | 20 |
| (0, 1) | 10 | 20 |
| (0, 2) | 11 | 19 |
| | ⋮ | ⋮ |

FIG. 9

| (X COORDINATE, y COORDINATE) | DETERMINATION RESULT DECxy |
|---|---|
| (0, 0) | 00<br>(NO MOVEMENT) |
| (0, 1) | 00<br>(NO MOVEMENT) |
| (0, 2) | 01<br>(MOVED DURING Q1Q2 MEASUREMENT PERIOD) |
| (0, 3) | 10<br>(MOVED DURING Q3Q4 MEASUREMENT PERIOD) |
| | ⋮ |

FIG. 16
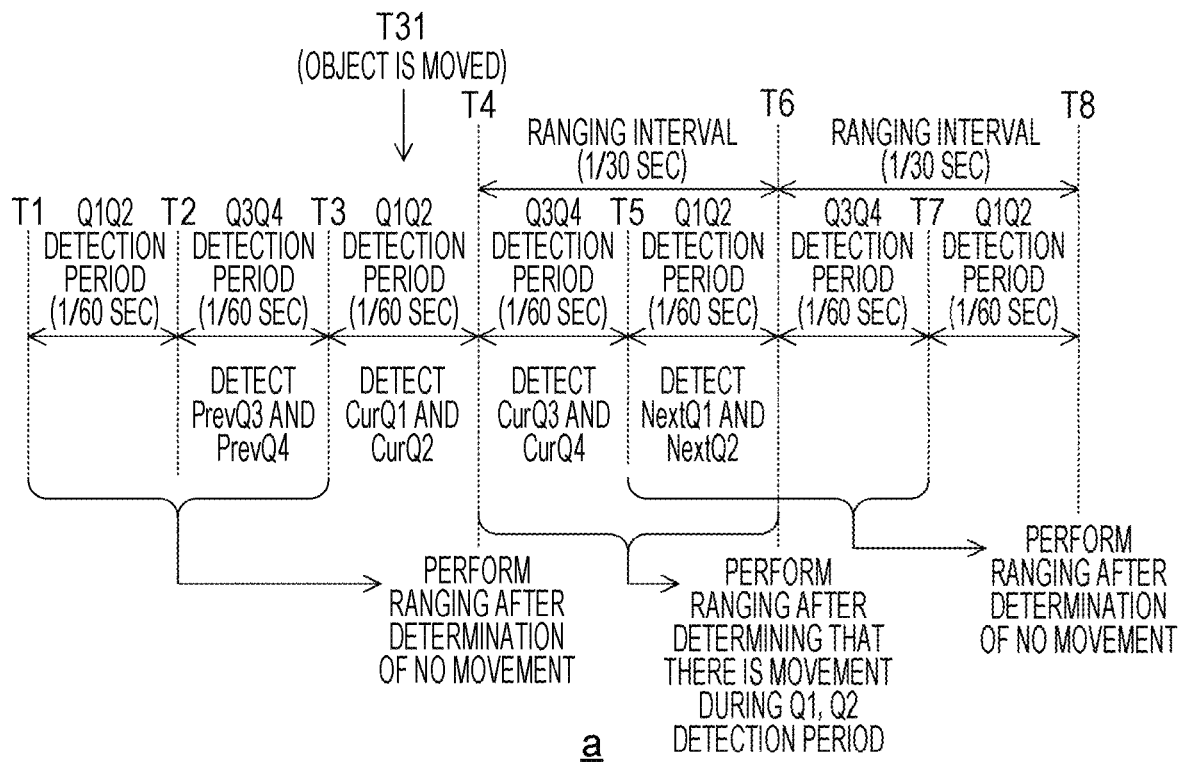
a
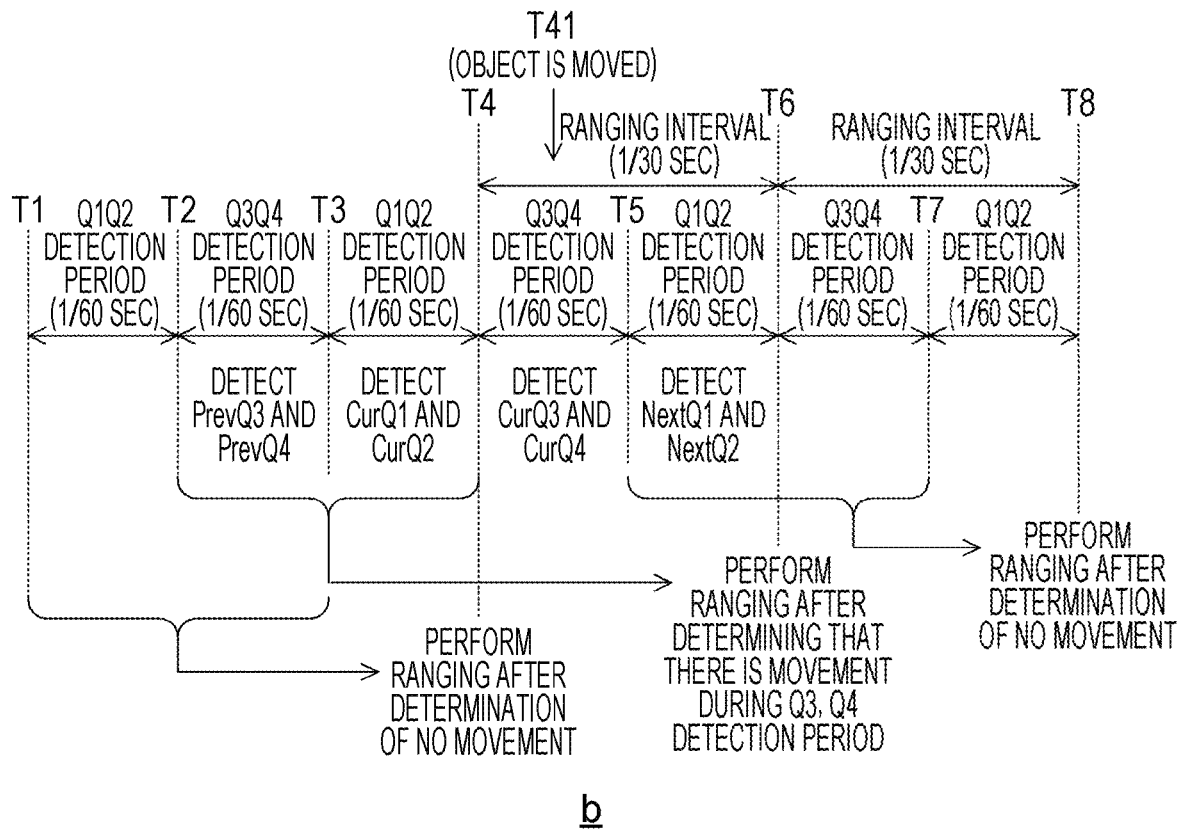
b

FIG. 20
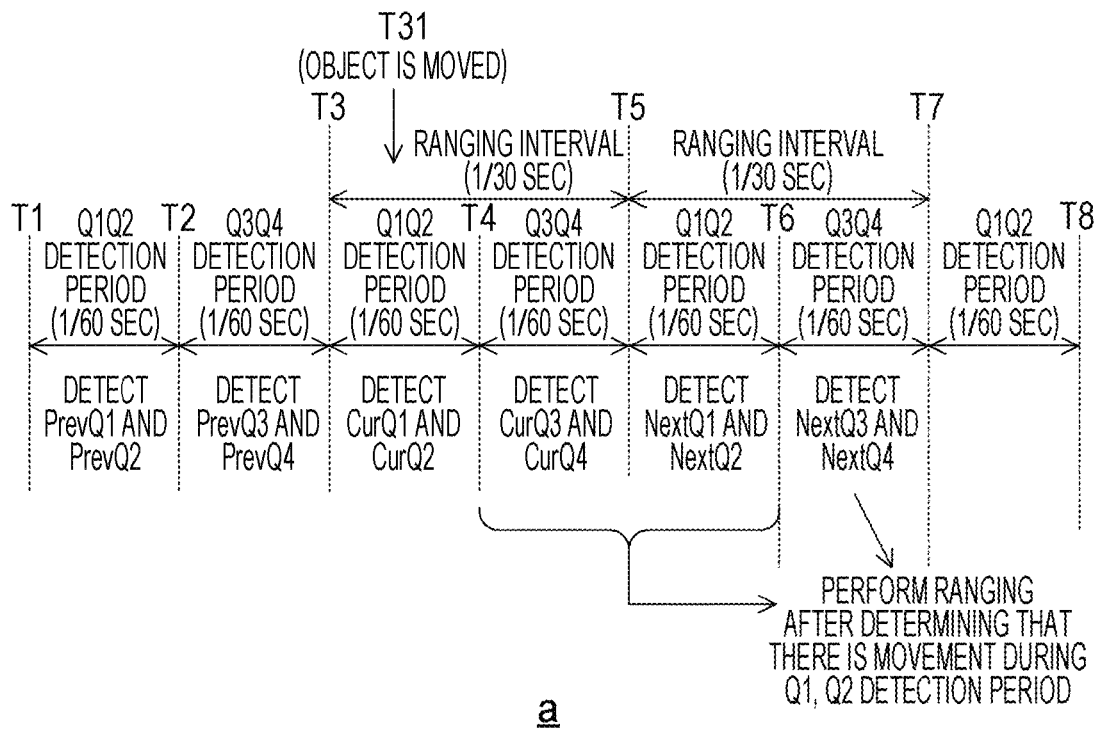
a
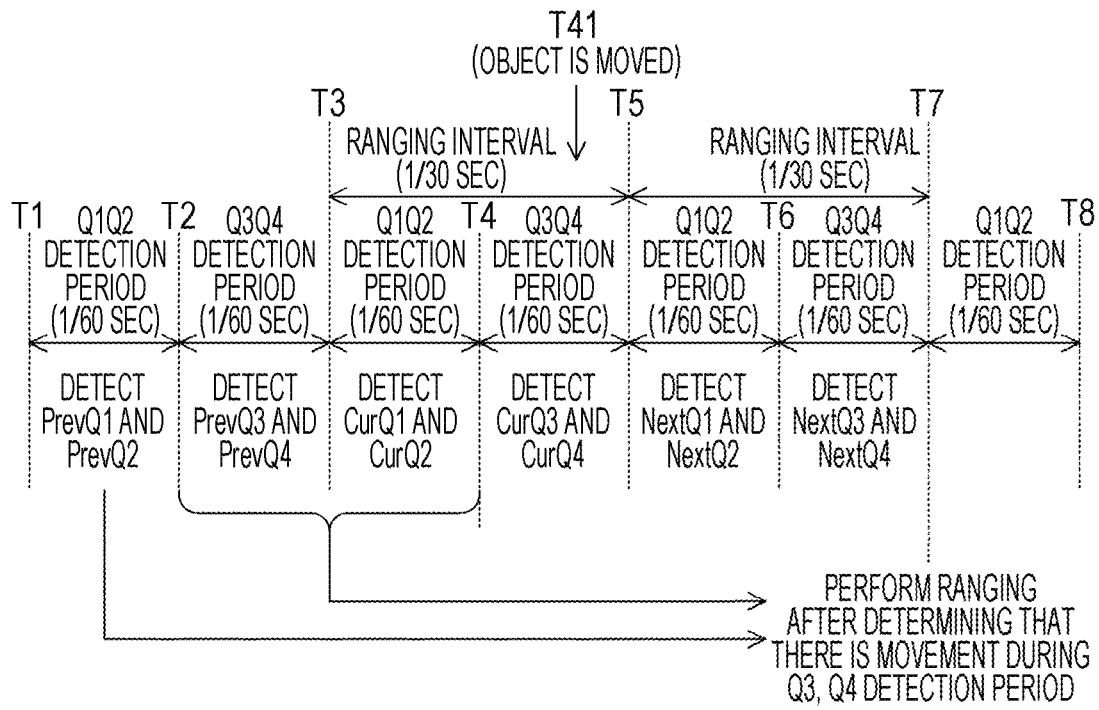
b

FIG. 24
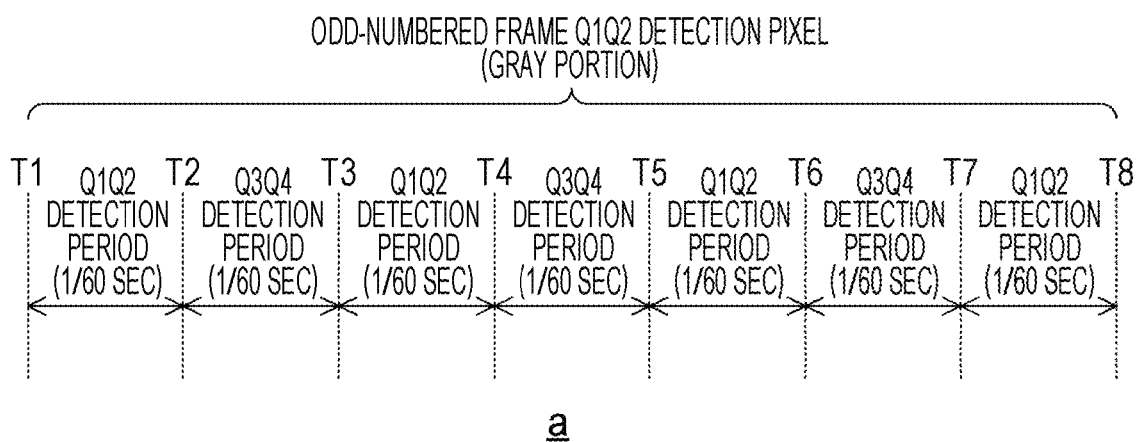
a
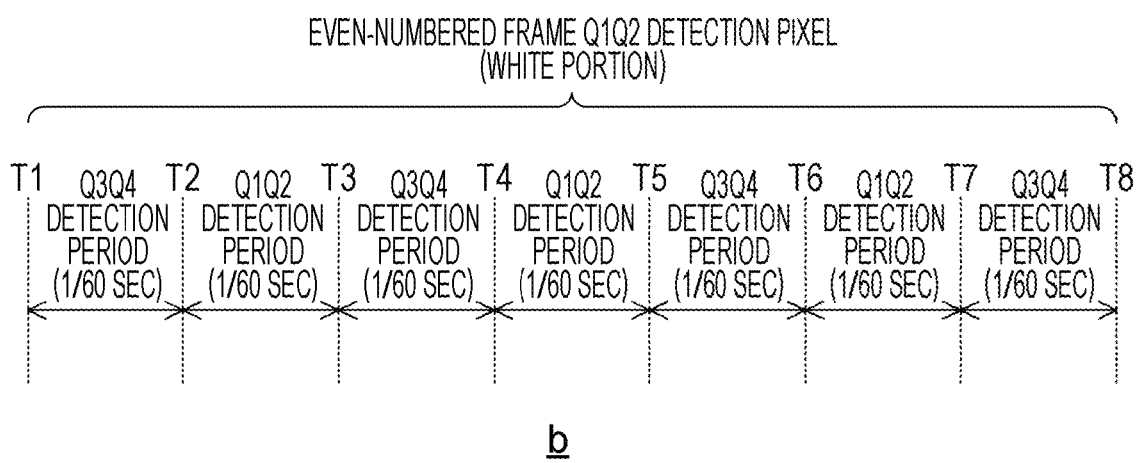
b

FIG. 27

| DETERMINATION RESULT DECxy | VARIABLES IN RANGING EXPRESSION | | | |
|---|---|---|---|---|
| | Q1 | Q2 | Q3 | Q4 |
| diffC (NO MOVEMENT IN FOCUSED PIXEL) | CurQ1 | CurQ2 | CurQ3 | CurQ4 |
| diffL1 (MOVED DURING Q3Q4 DETECTION PERIOD: LEFT PIXEL USED) | CurQ1 | CurQ2 | LeftQ3 | LeftQ4 |
| diffR1 (MOVED DURING Q3Q4 DETECTION PERIOD: RIGHT PIXEL USED) | CurQ1 | CurQ2 | RightQ3 | RightQ4 |
| diffU1 (MOVED DURING Q3Q4 DETECTION PERIOD: UPPER PIXEL USED) | CurQ1 | CurQ2 | UpQ3 | UpQ4 |
| diffD1 (MOVED DURING Q3Q4 DETECTION PERIOD: LOWER PIXEL USED) | CurQ1 | CurQ2 | DownQ3 | DownQ4 |
| diffL2 (MOVED DURING Q1Q2 DETECTION PERIOD: LEFT PIXEL USED) | LeftQ1 | LeftQ2 | CurQ3 | CurQ4 |
| diffR2 (MOVED DURING Q1Q2 DETECTION PERIOD: RIGHT PIXEL USED) | RightQ1 | RightQ2 | CurQ3 | CurQ4 |
| diffU2 (MOVED DURING Q1Q2 DETECTION PERIOD: UPPER PIXEL USED) | UpQ1 | UpQ2 | CurQ3 | CurQ4 |
| diffD2 (MOVED DURING Q1Q2 DETECTION PERIOD: LOWER PIXEL USED) | DownQ1 | DownQ2 | CurQ3 | CurQ4 |

RANGING MODULE, RANGING SYSTEM, AND METHOD OF CONTROLLING RANGING MODULE

CROSS REFERENCE TO RELATED APPLICATIONS

This application claims the benefit under 35 U.S.C. § 371 as a U.S. National Stage Entry of International Application No. PCT/JP2016/083161, filed in the Japanese Patent Office as a Receiving Office on Nov. 9, 2016, which claims priority to Japanese Patent Application Number JP 2016-032168, filed in the Japanese Patent Office on Feb. 23, 2016, each of which is hereby incorporated by reference in its entirety.

TECHNICAL FIELD

The present technology relates to a ranging module, a ranging system, and a control method for the ranging module. More specifically, the present technology relates to a ranging module and a control method for the same in which a distance is obtained on the basis of a phase difference between irradiation light and reflection light.

BACKGROUND ART

In related art, a ranging method called time of flight (ToF) is often used in an electronic device having a ranging function. The ToF is a method in which a light emitting unit irradiates an object with irradiation light having a sine wave or a rectangular wave, and a light receiving unit receives reflection light from the object, and then a ranging calculation unit measures a distance on the basis of a phase difference between the irradiation light and the reflection light. For example, a device that receives reflection light by using an image sensor, and performs ranging by the ToF method is disclosed (refer to Non-Patent Document 1, for example).

This image sensor detects a received light quantity from 0 degrees to 180 degrees as Q1, and detects a received light quantity from 180 degrees to 360 degrees as Q2 while setting, as 0 degrees, a specific phase (such as a timing of rising) of a light emission control signal that controls the light emitting unit. Additionally, the image sensor detects a received light quantity from 90 degrees to 270 degrees as Q3, and detects a received light quantity from 270 degrees to 90 degrees as Q4. The distance is measured by a following Expression by using the received light quantities Q1 to Q4.

$$d=(c/4\Pi f)\times\tan^{-1}\{(Q3-Q4)/(Q1-Q2)\} \quad \text{Expression 1}$$

In the above Expression, d represents a distance, and the unit is, for example, meters (m). c represents a light speed, and the unit is, for example, meters per second (m/s). $\tan^{-1}$ represents an inverse function of a tangent function. A value of (Q3−Q4)/(Q1−Q2) represents a phase difference between the irradiation light and the reflection light. Π represents a circumference ratio. Additionally, f represents a frequency of the irradiation light, and the unit is, for example, megahertz (MHz).

CITATION LIST

Non-Patent Document

Non-Patent Document 1: Andreas Kolb, Lindner Marvin, "Compensation of movement artifacts for time-of-flight cameras", [online] January 2014, Texas Instruments, Internet (URL: http://www.ti.com/lit/wp/sloa190b/sloa190b.pdf")

SUMMARY OF THE INVENTION

Problems to be Solved by the Invention

In above-described related art, Expression 1 is satisfied only in a case where an object is stationary over an exposure period to detect received light quantities Q1 to Q4. Therefore, when the object is moved during the exposure period, there may be a problem that an error occurs in a distance d obtained by using the received light quantities.

The present technology is created in view of such a situation, and is directed to accurately measuring a distance in a ranging system that performs ranging by a ToF method.

Solutions to Problems

The present technology is made to solve the above-described problems, and a first aspect thereof is a ranging module and a control method for the same, in which the ranging module includes: a light receiving unit adapted to receive reflection light from an object and detect a received light quantity of the reflection light within a predetermined detection period every time the predetermined detection period elapses; a determination unit adapted to determine whether the object is moved during each of the predetermined detection periods; and a ranging unit adapted to measure a distance to the object on the basis of the received light quantity within the predetermined detection period during which it is determined that the object is not moved. With this configuration, achieved is an effect in which the distance to the object is measured on the basis of the received light quantity within the period during which it is determined that the object is not moved.

Furthermore, according to the first aspect, the predetermined detection period includes a first and second detection periods different from each other, the light receiving unit receives the reflection light and detects first and second received light quantities over predetermined light receiving periods from first and second light reception start timings out of first, second, third, and fourth light reception start timings different from each other during the first detection period, the light receiving unit receives the reflection light and detects third and fourth received light quantities over predetermined light receiving periods from the third and fourth light reception start timings during the second detection period, and the ranging unit may measure the distance on the basis of a ratio of a difference between the first and second received light quantities to a difference between the third and fourth received light quantities. With this configuration, achieved is an effect in which the distance is measured on the basis of the ratio of the difference between the first and second received light quantities to the difference between the third and fourth received light quantities.

Furthermore, according to the first aspect, further provided are: a first delay unit adapted to delay the first and second received light quantities and output the delayed first and second received light quantities as first and second current received light quantities; a second delay unit adapted to delay the third and fourth received light quantities and output the delayed third and fourth received light quantities as third and fourth current received light quantities; and a third delay unit adapted to delay the third and fourth current received light quantities and output the delayed third and fourth current received light quantities as third and fourth preceding received light quantities, and the determination unit determines whether the object is moved during any one of the first and second detection periods on the basis of a difference between a sum of the first and second current received light quantities and a sum of the third and fourth current received light quantities. With this configuration, achieved is an effect in which whether the object is moved is determined on the basis of the difference between the sum of the first and second current received light quantities and the sum of the third and fourth current received light quantities.

Furthermore, according to the first aspect, in a case of determining that the object is moved during any one of the first and second detection periods, the determination unit determines whether the object is moved during the first detection period on the basis of a difference between a sum of third and fourth preceding received light quantities and the sum of the first and second current received light quantities, and in the case where it is determined that the object is moved during the first detection period, the ranging unit may measure the distance on the basis of a ratio of a difference between the third and fourth current received light quantities to a difference between the first and second received light quantities next to the first and second current received light quantities. With this configuration, achieved is an effect in which in the case where the object is moved during the first detection period, the distance is measured on the basis of the ratio of the difference between the third and fourth current received light quantities to the difference between the next first and second received light quantities.

Furthermore, according to the first aspect, in a case of determining that the object is moved during any one of the first and second detection periods, the determination unit determines whether the object is moved during the second detection period on the basis of a difference between a sum of the first and second received light quantities next to the first and second current received light quantities and the sum of the third and fourth current received light quantities, and in a case where it is determined that the object is moved during the second detection period, the ranging unit may measure the distance on the basis of a ratio of a difference between the first and second preceding received light quantities to a difference between the first and second current received light quantities. With this configuration, achieved is an effect in which in the case where the object is moved during the second detection period, the distance is measured on the basis of the ratio of the difference between the first and second preceding received light quantities to the difference between the first and second current received light quantities.

Furthermore, according to the first aspect, further included may be: a fourth delay unit adapted to delay the first and second received light quantities and output the delayed first and second received light quantities to the first delay unit as next first and second received light quantities; and a fifth delay unit adapted to delay the first and second current received light quantities and output the delayed first and second current received light quantities as first and second preceding received light quantities. With this configuration, achieved is an effect in which the next first and second received light quantities and the first and second preceding received light quantities are output.

Furthermore, according to the first aspect, in a case of determining that the object is moved during any one of the first and second detection periods, the determination unit determines whether the object is moved during the second detection period on the basis of a difference between a sum of the first and second preceding received light quantities and a sum of the third and fourth current received light quantities, and in a case where it is determined that the object is moved during the second detection period, the ranging unit may measure the distance on the basis of a ratio of a difference between first and second statistics to a difference between third and fourth preceding received light quantities while defining, as the first statistic, a statistic of the first preceding received light quantity and the first current received light quantity and further defining, as the second statistic, a statistic of the second preceding received light quantity and the second current received light quantity. With this configuration, achieved is an effect in which the distance is measured on the basis of the ratio of the difference between the first and second statistics to the difference between the third and fourth preceding received light quantities.

Furthermore, according to the first aspect, in a case of determining that the object is moved during any one of the first and second detection periods, the determination unit determines whether the object is moved during the first detection period on the basis of a difference between a sum of the third and fourth preceding received light quantities and a sum of the first and second current received light quantities, and in the case where it is determined that the object is moved during the first detection period, the ranging unit may measure the distance on the basis of a ratio of a difference between third and fourth statistics to a difference between the next first and second received light quantities while defining, as the third statistic, a statistic of the third current received light quantity and the next third received light quantity and further defining, as the fourth statistic, a statistic of the fourth current received light quantity and the next fourth received light quantity. With this configuration, achieved is an effect in which the distance is measured on the basis of the ratio of the difference between the next first and second received light quantities to the difference between the third and fourth statistics.

Furthermore, according to the first aspect, the light receiving unit includes: a first pixel adapted to receive the light receiving unit the reflection light and detect first and second received light quantities over predetermined light receiving periods from first and second light reception start timings out of first, second, third, and fourth light reception start timings different from each other during an odd-number-th predetermined detection period, and adapted to receive the reflection light and detect third and fourth received light quantities over predetermined light receiving periods from the third and fourth light reception start timings during an even-number-th predetermined detection period; and a second pixel adapted to receive the reflection light and detect third and fourth received light quantities over predetermined light receiving periods from the third and fourth light reception start timings during an odd-number-th predetermined detection period, and adapted to receive the reflection light and detect first and second received light quantities over the predetermined light receiving periods from the first and second light reception start timings during an even-number-th predetermined detection period, in which the ranging unit may measure the distance on the basis of a ratio of the difference between the first and second received light quantities to the difference between the third and fourth received light quantities. With this configuration, achieved is an effect in which the distance is measured on the basis of the ratio of the difference between the first and second received light quantities to the difference between the third and fourth received light quantities.

Furthermore, according to the first aspect, the determination unit may determine whether the object is moved on the basis of a difference between a sum of the first and second received light quantities and a sum of the third and fourth received light quantities in a focused pixel focused out of the first and second pixels. With this configuration, achieved is an effect in which whether the object is moved is determined on the basis of the difference between the sum of the first and second received light quantities and the sum of the third and fourth received light quantities of the focused pixel.

Furthermore, according to the first aspect, in a case where it is determined that the object is moved, the ranging unit may measure the distance on the basis of a ratio of a difference between received light quantities in the focused pixel to a difference between received light quantities in an adjacent pixel adjacent to the focused pixel out of the first and second pixels. With this configuration, achieved is an effect in which the distance is measured on the basis of the difference between the received light quantities in the focused pixel and the difference between the received light quantities in the adjacent pixel.

Furthermore, according to the first aspect, a light emitting unit adapted to irradiate the object with irradiation light may be further included. With this configuration, achieved is an effect in which the object is irradiated with the irradiation light.

Additionally, a second aspect of the present technology is a ranging system including: a light emitting unit adapted to irradiate an object with irradiation light; a light receiving unit adapted to receive reflection light from the object and detect a received light quantity of the reflection light within a predetermined detection period every time the predetermined detection period elapses;

a determination unit adapted to determine whether the object is moved during each of the predetermined detection periods; and a ranging unit adapted to measure a distance to the object on the basis of the received light quantity within the predetermined detection period during which it is determined that the object is not moved. With this configuration, achieved is an effect in which the distance is measured on the basis of a ratio of a difference between first and second received light quantities to a difference between third and fourth received light quantities.

Furthermore, according to the first aspect, an imaging unit adapted to capture image data every time the predetermined detection period elapses may be further included, in which the determination unit may determine whether the object is moved on the basis of the image data. With this configuration, achieved is an effect in which whether the object is moved is determined on the basis of the image data.

Effects of the Invention

According to the present technology, it is possible to achieve an excellent effect in which a distance can be accurately measured in the ranging system that performs ranging by a ToF method. Note that the effects recited herein are not constantly limited thereto and may be any one of those recited in the present disclosure.

BRIEF DESCRIPTION OF DRAWINGS

FIG. 8 is a diagram illustrating an exemplary data configuration of image data according to the first embodiment of the present technology.

FIG. 9 is a diagram illustrating an exemplary determination data according to the first embodiment of the present technology.

FIG. 16 is a timing chart illustrating an exemplary ranging method in a case where an object is moved according to the first embodiment of the present technology.

FIG. 20 is a timing chart illustrating an exemplary ranging method in a case where an object is moved according to the first modified example of the first embodiment of the present technology.

FIG. 24 is a timing chart illustrating an exemplary received light quantity detection method according to the second embodiment of the present technology.

FIG. 27 is a diagram illustrating an exemplary calculation method for each determination result according to the second embodiment of the present technology.

MODE FOR CARRYING OUT THE INVENTION

Modes to implement the present technology (hereinafter referred to as "embodiments") will be described below. The description will be provided in the following order.

1. First Embodiment (example in which ranging is performed on basis of received a light quantity when an object is not moved)

2. Second embodiment (example in which two kinds of pixels having different timings of light receiving are arranged, and ranging is performed on basis of received light quantities when an object is not moved)

1. First Embodiment (Exemplary Configuration of Ranging Module)

Figure 1:
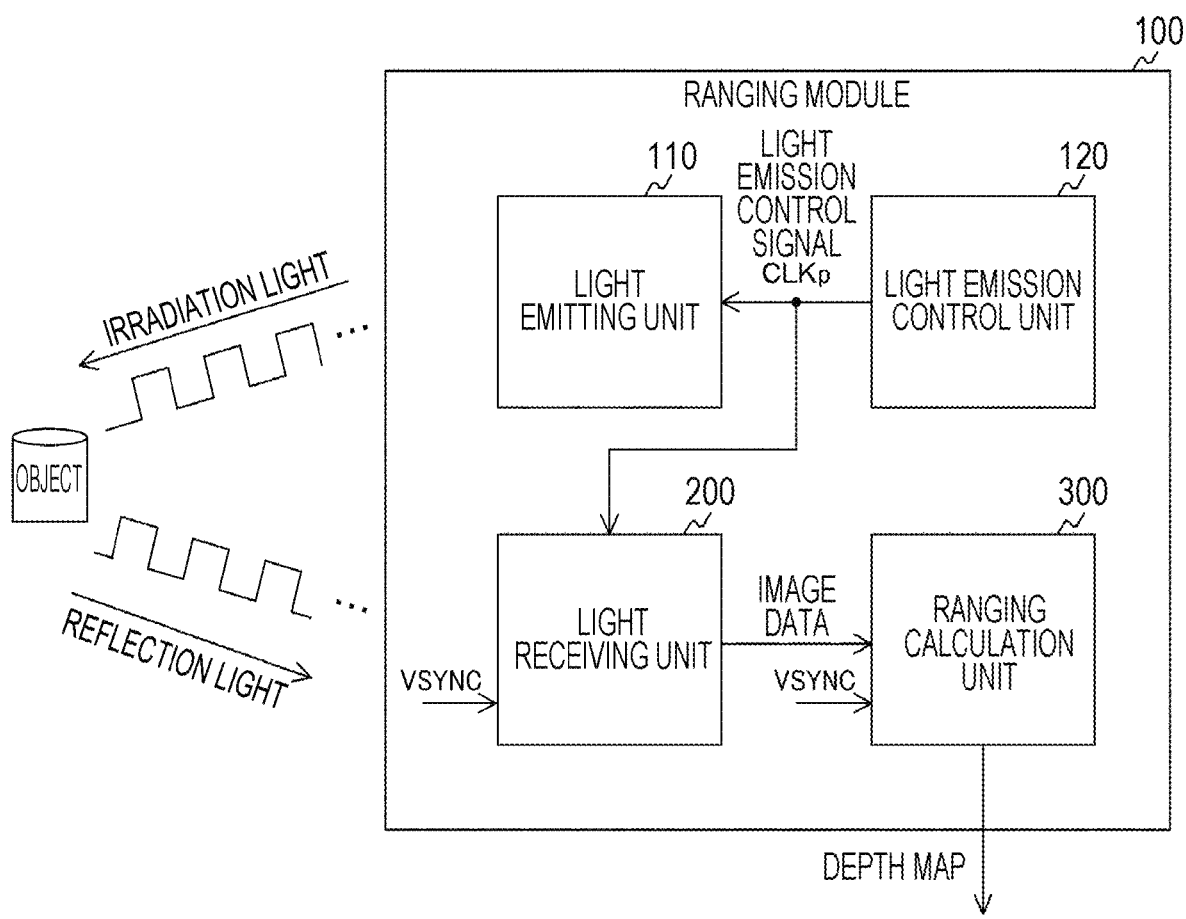
FIG. 1 is a block diagram illustrating an exemplary configuration of a ranging module according to a first embodiment of the present technology.

FIG. 1 is a block diagram illustrating an exemplary configuration of a ranging module 100 according to a first embodiment. The ranging module 100 measures a distance by a ToF method, and includes a light emitting unit 110, a light emission control unit 120, a light receiving unit 200, and a ranging calculation unit 300.

The light emitting unit 110 emits irradiation light having luminance varied periodically, and irradiates an object with the irradiation light. The light emitting unit 110 generates the irradiation light in synchronization with, for example, a light emission control signal CLKp having a rectangular wave. Furthermore, for example, a light emitting diode is used as the light emitting unit 110, and near infrared light or the like is used as the irradiation light. Note that the light emission control signal CLKp is not limited to have a rectangular wave as far as the signal is a periodic signal. For example, the light emission control signal CLKp may also have a sine wave.

The light emission control unit 120 controls the light emitting unit 110. The light emission control unit 120 generates the light emission control signal CLKp and supplies the same to the light emitting unit 110 and the light receiving unit 200. The light emission control signal CLKp has a frequency of, for example, 20 megahertz (MHz). Meanwhile, the frequency of light emission control signal CLKp is not limited to 20 megahertz (MHz) and may also be 5 megahertz (MHz) or the like.

The light receiving unit 200 receives reflection light reflected from an object and detects a received light quantity within a cycle every time the cycle of a vertical synchronization signal VSYNC elapses. For example, a periodic signal of 60 hertz (Hz) is used as the vertical synchronization signal VSYNC. Additionally, in the light receiving unit 200, a plurality of pixel circuits is arranged in a two-dimensional lattice shape. The light receiving unit 200 supplies the ranging calculation unit 300 with image data (frame) including pixel data corresponding to received light quantities of these pixel circuits. Note that a frequency of the vertical synchronization signal VSYNC is not limited to 60 hertz (Hz), and may also be 30 hertz (Hz) or 120 hertz (Hz).

The ranging calculation unit 300 measures a distance to the object on the basis of the image data by the ToF method. The ranging calculation unit 300 measures the distance per pixel circuit, and generates a depth map in which the distance to the object is indicated by a gradation value for each pixel. The depth map is used for, for example, image processing to perform blur processing in accordance with a level corresponding to the distance, auto focus (AF) processing to obtain a focus point of a focus lens in accordance with the distance, and the like.

[Exemplary Configuration of Light Receiving Unit]

Figure 2:
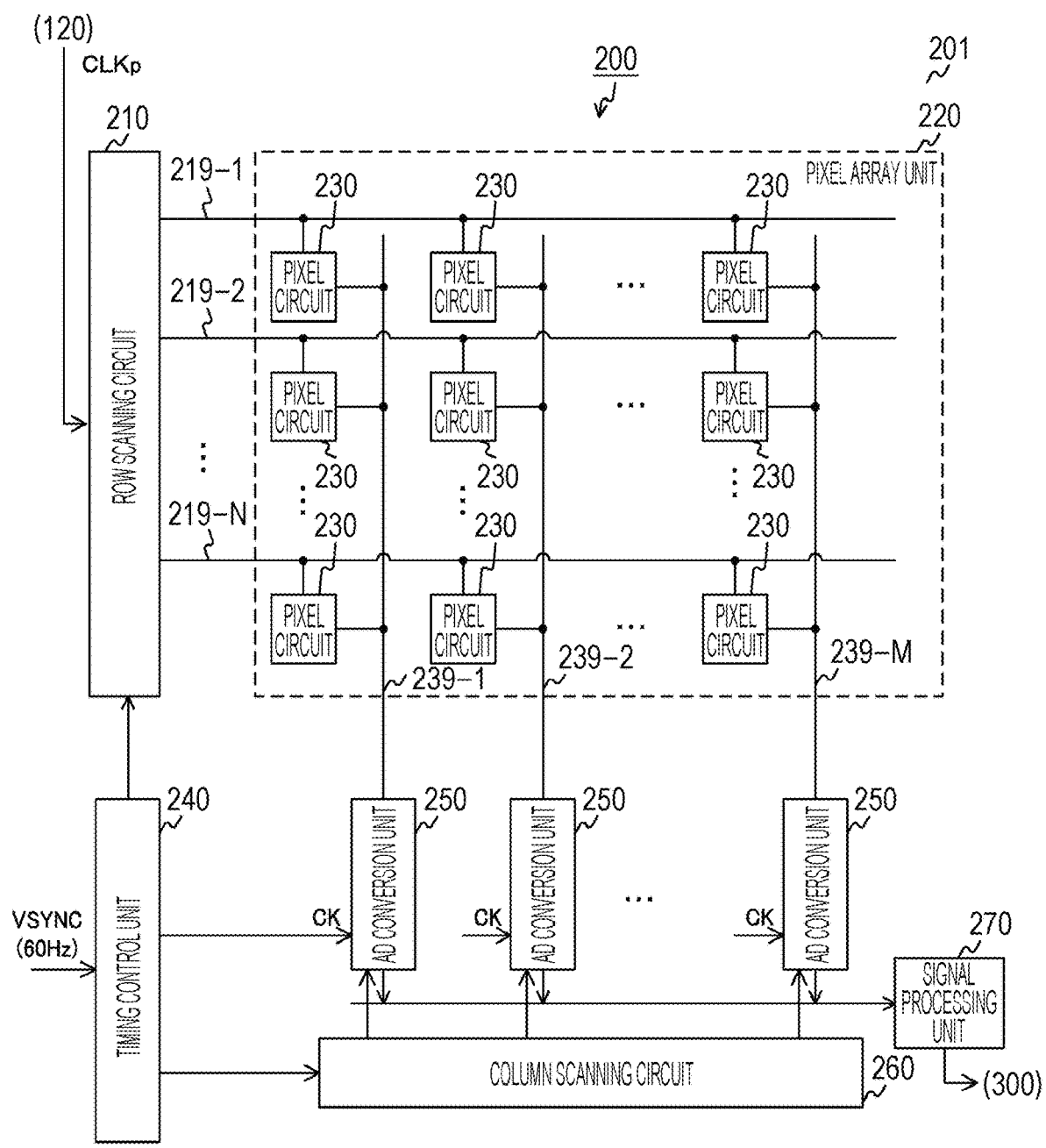
FIG. 2 is a block diagram illustrating an exemplary configuration of a light receiving unit according to the first embodiment of the present technology.

FIG. 2 is a block diagram illustrating an exemplary configuration of the light receiving unit 200 according to the first embodiment. The light receiving unit 200 includes a row scanning circuit 210, a pixel array unit 220, a timing control unit 240, a plurality of analog to digital (AD) conversion units 250, and a column scanning circuit 260. In the pixel array unit 220, a plurality of pixel circuits 230 is arranged in a two-dimensional lattice shape. In the following, a set of pixel circuits 230 arrayed in a predetermined direction will be referred to as a "row", and a set of pixel circuits 230 arrayed in a direction perpendicular to the row will be referred to as a "column". The above-described AD conversion unit 250 is provided per column.

The timing control unit 240 controls the row scanning circuit 210, AD conversion unit 250, and column scanning circuit 260 in synchronization with a vertical synchronization signal VSYNC.

The row scanning circuit 210 simultaneously exposes all of the rows, sequentially selects the rows, and causes the rows to output pixel signals after finishing the exposure. The pixel circuit 230 receives reflection light under the control of the row scanning circuit 210, and outputs a pixel signal of a level corresponding to a received light quantity.

The AD conversion unit 250 applies AD conversion to pixel signals from a corresponding column. The AD conversion unit 250 outputs, as pixel data, the pixel signals subjected to AD conversion to the signal processing unit 270 under the control of the column scanning circuit 260. The column scanning circuit 260 sequentially selects the AD conversion units 250 and causes the same to output the pixel data.

The signal processing unit 270 applies signal processing such as correlated double sampling (CDS) processing to image data including the pixel data. The signal processing unit 270 supplies the ranging calculation unit 300 with the image data that has been subjected to the signal processing.

Note that actually a lens to collect reflection light is further provided in the light receiving unit 200, but illustration of this lens is omitted in FIG. 2 for convenience of description.

Additionally, the pixel circuits 230 are arrayed in the light receiving unit 200 in a two-dimensional lattice shape, but not limited to this configuration. For example, line sensors in which only one line including the pixel circuits 230 are arrayed in a row or column direction may be used as the light receiving unit 200. Alternatively, only one light receiving sensor having a configuration similar to the pixel circuit 230 may also be used as the light receiving unit 200.

[Exemplary Configuration of Pixel Circuit]

Figure 3:
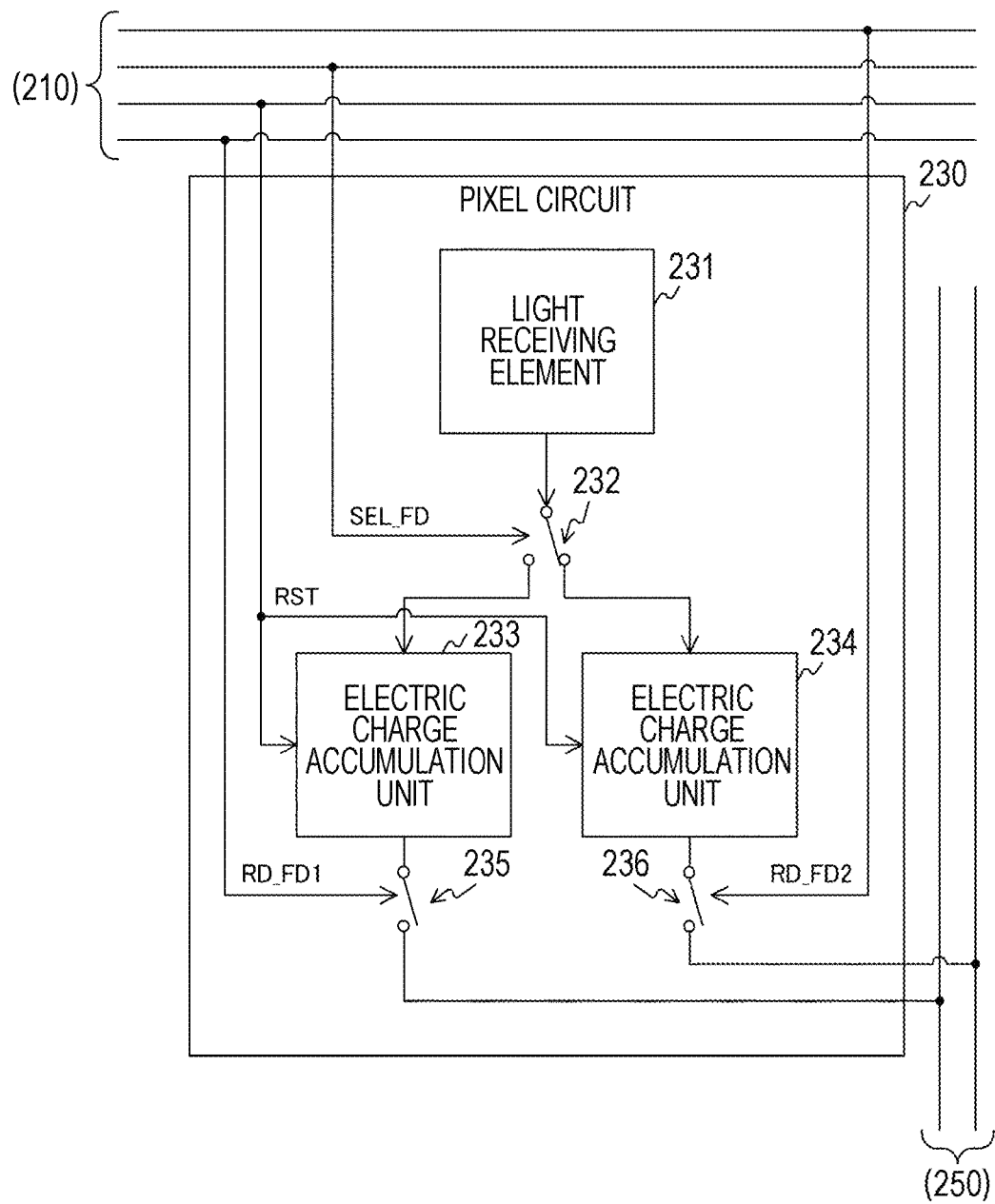
FIG. 3 is a block diagram illustrating an exemplary configuration of a pixel circuit according to the first embodiment of the present technology.

FIG. 3 is a block diagram illustrating an exemplary configuration of the pixel circuit 230 according to the first embodiment. The pixel circuit 230 includes a light receiving element 231, a transfer switch 232, electric charge accumulation units 233 and 234, and selection switches 235 and 236.

The light receiving element 231 photoelectrically converts reflection light, and generates electric charge. As the light receiving element 231, for example, a photodiode is used.

The transfer switch 232 transfers the electric charge generated by the light receiving element 231 to any one of the electric charge accumulation units 233 and 234 under the control of the row scanning circuit 210. The transfer switch 232 is implemented by, for example, a pair of metal-oxide-semiconductor (MOS) transistors and the like.

The electric charge accumulation units 233 and 234 accumulate electric charge, and generate voltage corresponding to an accumulation amount thereof. As the electric charge accumulation units 233 and 234, for example, floating diffusion layers are used.

The selection switch 235 opens and closes a line between the electric charge accumulation unit 233 and the AD conversion unit 250 under the control of the row scanning circuit 210. The selection switch 236 opens and closes a line between the electric charge accumulation unit 234 and the AD conversion unit 250 under the control of the row scanning circuit 210. The selection switches 235 and 236 are implemented by, for example, MOS transistors or the like.

Figure 4:
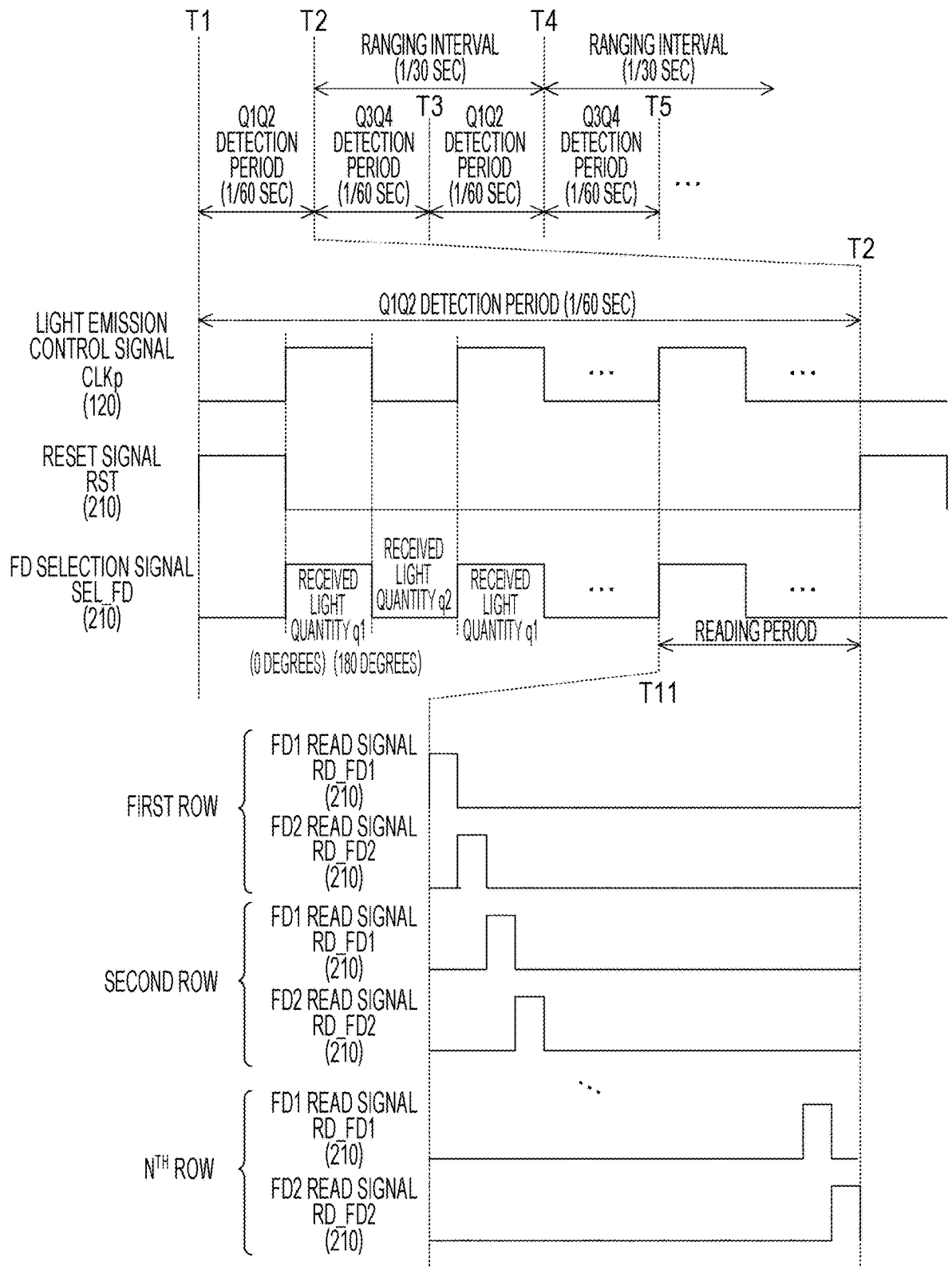
FIG. 4 is a timing chart illustrating exemplary exposure control of a pixel circuit within a Q1Q2 detection period according to the first embodiment of the present technology.

FIG. 4 is a timing chart illustrating exemplary exposure control of a pixel circuit 230 within a Q1Q2 detection period according to the first embodiment. The pixel circuit 230 alternately repeats detection of the received light quantities Q1 and Q2 and detection of the received light quantities Q3 and Q4. In the following, the detection period for the received light quantities Q1 and Q2 will be referred to as a "Q1Q2 detection period", and the detection period for the received light quantities Q3 and Q4 will be referred to as a "Q3Q4 detection period". A length of each of the Q1Q2 detection period and the Q3Q4 detection period is a cycle (e.g., 1/60 seconds) of the vertical synchronization signal VSYNC.

Here, the received light quantity Q1 is obtained by accumulating received light quantities q1 from 0 degrees to 180 degrees over the Q1Q2 detection period while a specific phase (e.g., rising) of the light emission control signal CLKp is set to 0 degrees. Since a frequency of the light emission control signal CLKp is high like 20 megahertz (MHz), a received light quantity q1 per cycle (1/20 microseconds) is too little to be detected. Therefore, the pixel circuit 230 accumulates respective quantities q1 over the Q1Q2 detection period such as 1/60 seconds longer than the cycle of the light emission control signal CLKp (1/20 microseconds), and detects a total amount thereof as the received light quantity Q1. Furthermore, the received light quantity Q2 is obtained by accumulating received light quantities q2 of reflection light from 180 degrees to 360 degrees over the Q1Q2 detection period.

Additionally, the received light quantity Q3 is obtained by accumulating received light quantities q3 of the reflection light from 90 degrees to 270 degrees over the Q3Q4 detection period. Also, the received light quantity Q4 is obtained by accumulating received light quantities q4 of the reflection light from 270 degrees to 90 degrees over the Q3Q4 detection period.

A distance d to an object is calculated by substituting the received light quantities Q1, Q2, Q3, and Q4 into the Expression 1 Thus, the received light quantities Q1 and Q2 detected during the Q1Q2 detection period of 1/60 seconds and the received light quantities Q3 and Q4 detected during the Q3Q4 detection period of 1/60 seconds are necessary for ranging. Therefore, ranging is performed at intervals of 1/30 seconds.

For example, during the Q1Q2 detection period from a timing T1 to a timing T2, the received light quantities Q1 and Q2 during the period are detected. First, the row scanning circuit 210 supplies reset signals RST to all of the rows during a predetermined pulse period from the timing T1. The electric charge accumulation amounts of all of the rows are initialized by the reset signals SRT.

Then, during the Q1Q2 detection period, the row scanning circuit 210 sets, to a high level, FD selection signals SEL_FD of all of the rows from 0 degrees through 180 degrees within the cycle of the light emission control signal CLKp, and electric charge generated by the light receiving element 231 is transmitted to the electric charge accumulation unit 233. With this control, the received light quantities q1 are accumulated in the electric charge accumulation unit 233.

Additionally, during the Q1Q2 detection period, the row scanning circuit 210 sets, to a low level, FD selection signals SEL_FD of all of the rows from 180 degrees through 360 degrees within the cycle of the light emission control signal CLKp, and the electric charge generated by the light receiving element 231 is transferred to the electric charge accumulation unit 234. With this control, the received light quantities q2 are accumulated in the electric charge accumulation unit 234.

Then, at a timing T11 immediately before the timing T2, the row scanning circuit 210 sequentially supplies FD read signals RD_FD1 and RD_FD2 to the first row. With this control, pixel signals corresponding to the received light quantities Q1 and Q2 of the first row are read. Next, the row scanning circuit 210 sequentially supplies FD read signals RD_FD1 and RD_FD2 to a second row and then read pixel signals. In the following, the row scanning circuit 210 sequentially selects the rows and reads pixel signals in a similar manner.

Thus, during the Q1Q2 detection period, each of the pixel circuits 230 detects the received light quantity Q1 from 0 degrees to 180 degrees and the received light quantity Q2 from 180 degrees to 360 degrees.

Figure 5:
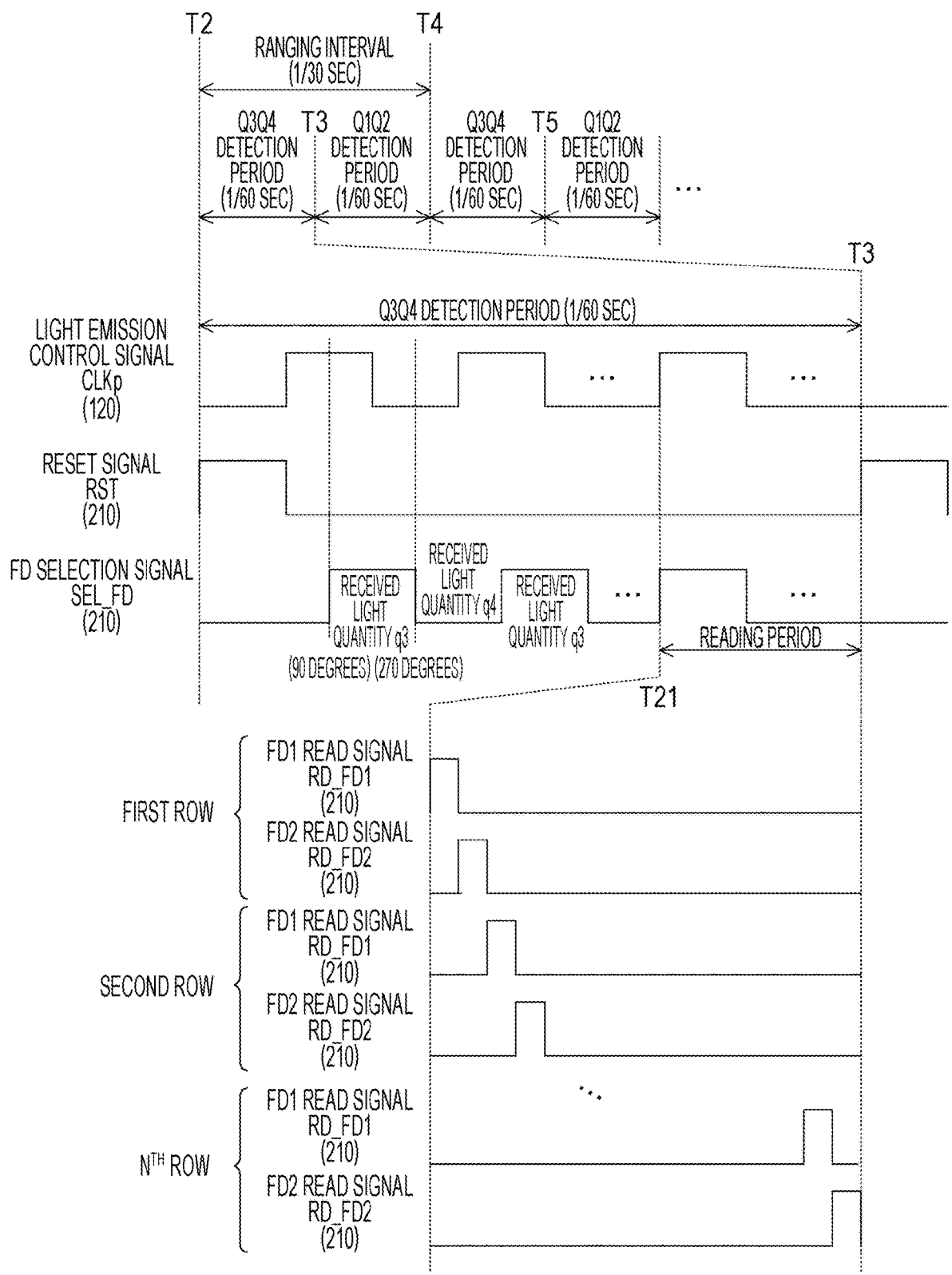
FIG. 5 is a timing chart illustrating exemplary exposure control of a pixel circuit within a Q3Q4 detection period according to the first embodiment of the present technology.

FIG. 5 is a timing chart illustrating exemplary exposure control of the pixel circuit 230 within the Q3Q4 detection period according to the first embodiment. For example, during the Q3Q4 detection period from the timing T2 to a timing T3, the received light quantities Q3 and Q4 during the period are detected. First, the row scanning circuit 210 supplies reset signals RST to all of the rows during a predetermined pulse period from the timing T2, and initializes electric charge accumulation amounts of all of the rows.

Then, during the Q3Q4 detection period, the row scanning circuit 210 sets, to a high level, FD selection signals SEL_FD of all of the rows from 90 degrees through 270 degrees within the cycle of the light emission control signal CLKp, and the electric charge generated by the light receiving element 231 is transferred to the electric charge accumulation unit 233. With this control, the received light quantities q3 are accumulated in the electric charge accumulation unit 233.

Additionally, during the Q3Q4 detection period, the row scanning circuit 210 sets, to a low level, FD selection signals SEL_FD of all of the rows from 270 degrees through 90 degrees within the cycle of the light emission control signal CLKp, and the electric charge generated by the light receiving element 231 is transferred to the electric charge accumulation unit 234. With this control, the received light quantities q4 are accumulated in the electric charge accumulation unit 234.

Then, at a timing T21 immediately before the timing T3, the row scanning circuit 210 sequentially supplies the first row with the FD read signals RD_FD1 and RD_FD2. With this control, pixel signals corresponding to the received light quantities Q3 and Q4 of the first row are read. In the following, the row scanning circuit 210 sequentially selects the rows and reads pixel signals in a similar manner.

Figure 6:
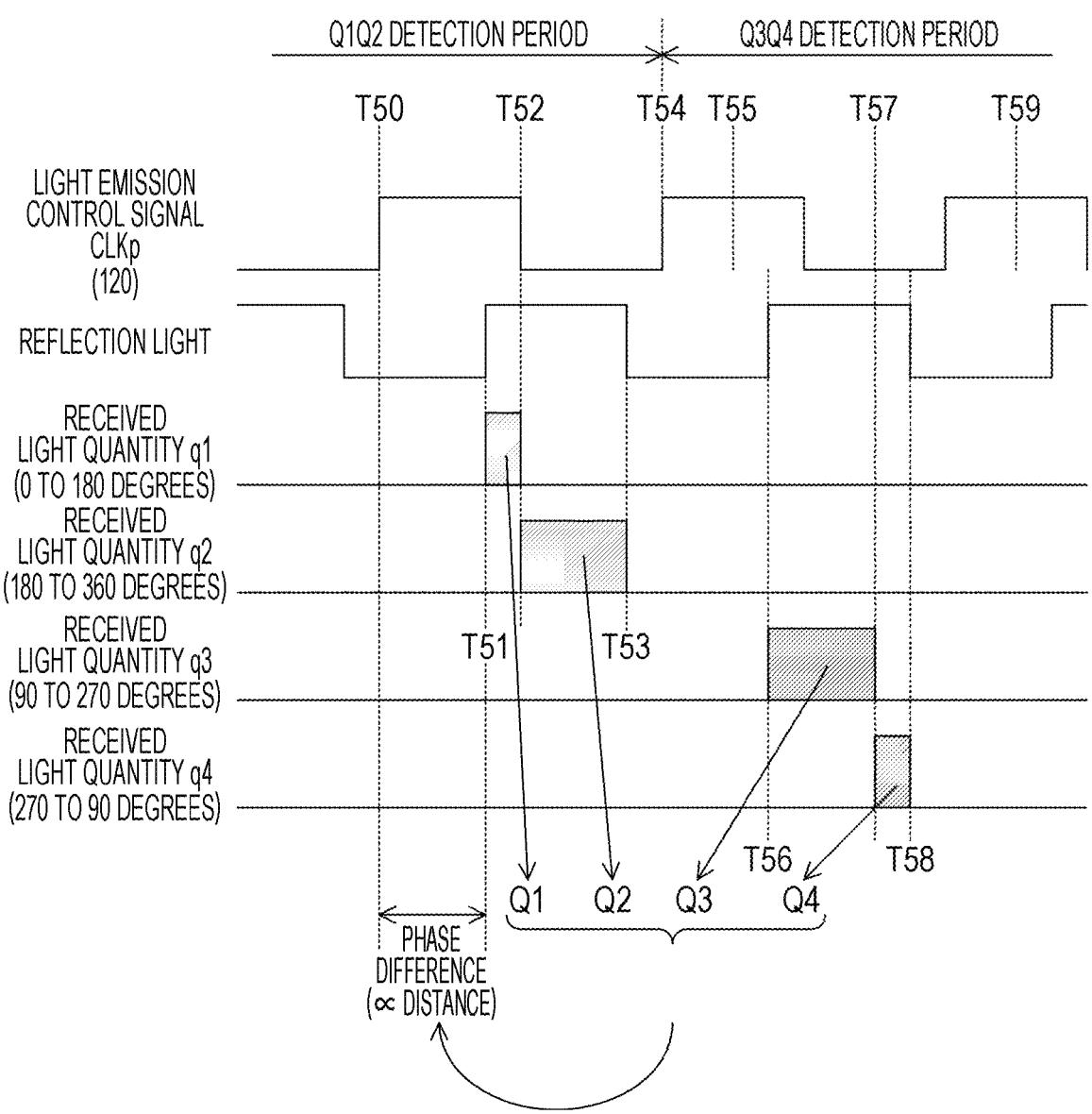
FIG. 6 is a diagram to describe a ranging method according to the first embodiment of the present technology.

FIG. 6 is a diagram to describe a ranging method according to the first embodiment. A phase difference having a value corresponding to a distance to an object is generated between irradiation light and reflection light synchronized with the light emission control signal CLKp. The pixel circuit 230 transfers, to the electric charge accumulation unit 233, received light quantities from a timing T50 (0 degrees) to a timing T52 (180 degrees) within the Q1Q2 detection period. In a case where the reflection light starts light emission at the timing T51, the received light quantities from the timing T51 to the timing T52 are transferred as the received light quantities q1.

Furthermore, the pixel circuit 230 transfers, to the electric charge accumulation unit 234, received light quantities from the timing T52 (180 degrees) to a timing T54 (360 degrees) within the Q1Q2 detection period. In a case where the reflection light finishes light emission at a timing T53, the received light quantities from the timing T52 to a timing T53 are transferred as the received light quantities q2.

Then, the pixel circuit 230 transfers, to the electric charge accumulation unit 233, received light quantities from a timing T55 (90 degrees) to a timing T57 (270 degrees) within the Q3Q4 detection period. In a case where the reflection light starts light emission at a timing T56, received light quantities from a timing T56 to the timing T57 are transferred as the received light quantities q3.

Furthermore, the pixel circuit 230 transfers, to the electric charge accumulation unit 234, received light quantities from the timing T57 (270 degrees) to a timing T59 (90 degrees) within the Q3Q4 detection period. In a case where the reflection light finishes light emission at a timing T58, received light quantities from the timing T57 to a timing T58 are transferred as the received light quantities q4.

Then, cumulative values of the received light quantities q1 and q2 within the Q1Q2 detection period are read as the received light quantities Q1 and Q2 respectively, and cumulative values of the received light quantities q3 and q4 within the Q3Q4 detection period are read as the received light quantities Q3 and Q4, respectively. A ratio of a difference between Q1 and Q2 to a difference between Q3 and Q4 is a value in accordance with a phase difference between the irradiation light and the reflection light. Therefore, the ranging calculation unit 300 can calculate a distance d in accordance with the phase difference from these Q1 to Q4.

Additionally, in a case where the object is stationary over the Q1Q2 detection period and Q3Q4 detection period, a relational expression as follows is satisfied between the received light quantities Q1 to Q4. Q1+Q2=Q3+Q4

The reason is that a total quantity (electric charge amount) of light reaching pixels from a certain phase R (for example, 0) degrees to R+180 degrees and a total quantity (electric charge amount) of light reaching pixels from R+180 degrees to R+360 degrees is constant irrespective of a value of R. Therefore, the ranging module 100 can determine, on the basis of the above Expression, whether the object is moved.

[Exemplary Configuration of Ranging Calculation Unit]

Figure 7:
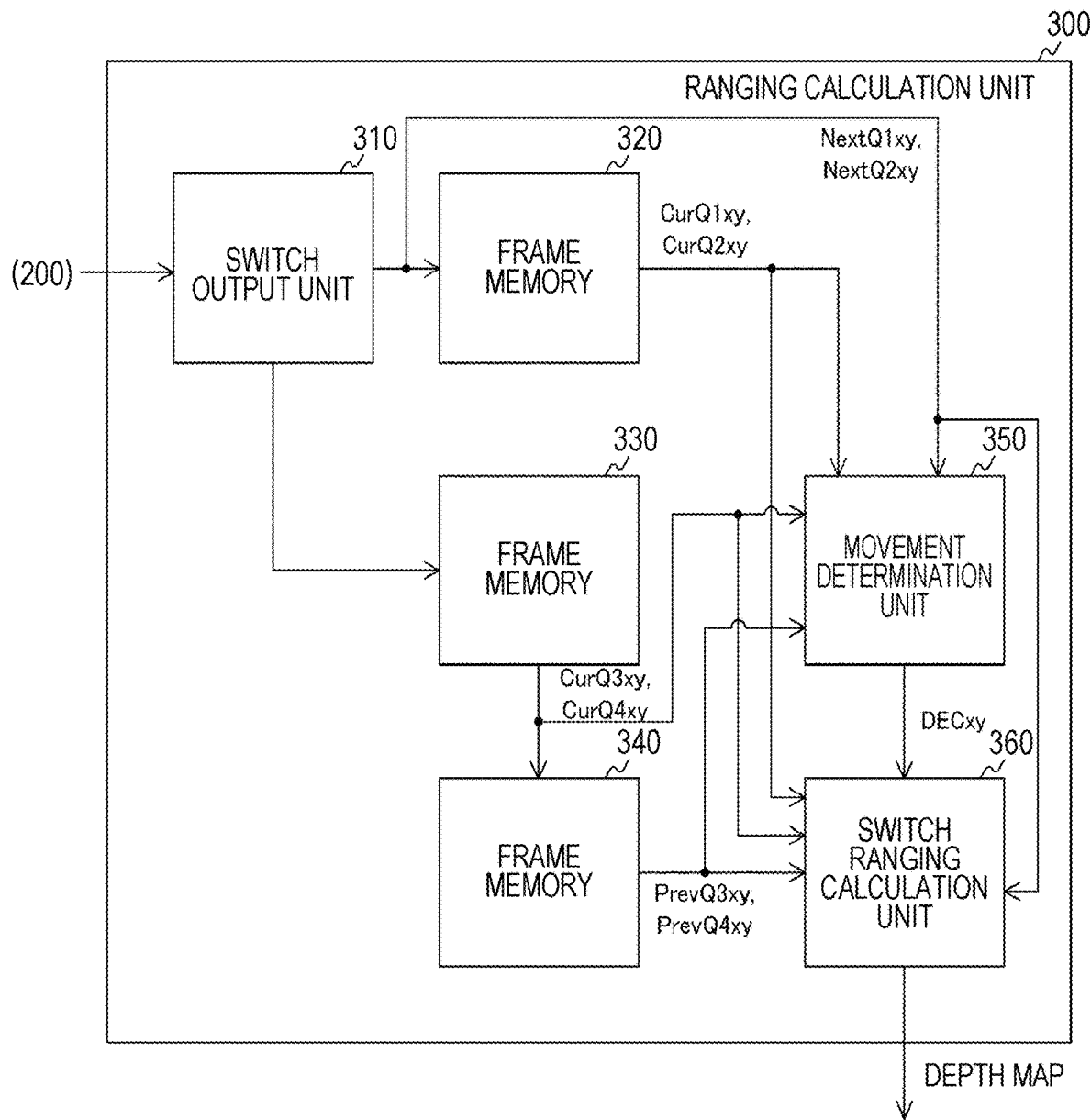
FIG. 7 is a block diagram illustrating an exemplary configuration of a ranging calculation unit according to the first embodiment of the present technology.

FIG. 7 is a block diagram illustrating an exemplary configuration of the ranging calculation unit 300 according to the first embodiment. The ranging calculation unit 300 includes a switch output unit 310, frame memories 320, 330, and 330, a movement determination unit 350, and a switch ranging calculation unit 360.

The switch output unit 310 switches an output destination of pixel data between during the Q1Q2 detection period and during the Q3Q4 detection period. The switch output unit 310 supplies pixel data of the Q1Q2 detection period to the frame memory 320, movement determination unit 350, and switch ranging calculation unit 360. Pixel data of coordinates (x, y) during the Q1Q2 detection period includes received light quantities Q1xy and Q2xy. The Q1xy and Q2xy are supplied to the movement determination unit 350 and the switch ranging calculation unit 360 as NextQ1xy and NextQ2xy.

Additionally, the switch output unit 310 supplies pixel data of the Q3Q4 detection period to the frame memory 330. Pixel data of coordinates (x, y) during the Q3Q4 detection period includes received light quantities Q3xy and Q4xy.

The frame memory 320 delays the received light quantities Q1xy and Q2xy and outputs the same as CurQ1xy and CurQ2xy to the movement determination unit 350 and the switch ranging calculation unit 360. Note that the frame memory 320 is an example of a first delay unit described in claims.

The frame memory 330 delays the received light quantities Q3xy and Q4xy and outputs the same as CurQ3xy and CurQ4xy to the frame memory 340, movement determination unit 350, and the switch ranging calculation unit 360. Note that the frame memory 330 is an example of a second delay unit described in claims.

The frame memory 340 delays the received light quantities CurQ3xy and CurQ4xy and outputs the same as PrevQ3xy and PrevQ4xy to the movement determination unit 350 and the switch ranging calculation unit 360. Note that the frame memory 340 is an example of a third delay unit described in claims.

The movement determination unit 350 determines, for each pixel, whether the object is moved. The movement determination unit 350 sequentially focuses on pixels. For a focused pixel, the movement determination unit 350 first calculates differences diffC, diffN, and diffP by following Expressions.

$$\text{diffC} = (CurQ1 + CurQ2) - (CurQ3 + CurQ4) \quad \text{Expression 2}$$

$$\text{diffN} = (NextQ1 + NextQ2) - (CurQ3 + CurQ4) \quad \text{Expression 3}$$

$$\text{diffP} = (CurQ1 + CurQ2) - (PrevQ3 + PrevQ4) \quad \text{Expression 4}$$

In Expressions 2 to 4, a subscript xy for each received light quantity is omitted for convenience of description. In the following, xy for each received light quantity will be omitted as necessary in a similar manner.

Then, the movement determination unit 350 determines whether diffC is a predetermined threshold (≈0) or less. In a case of not satisfying diffC≈0, the movement determination unit 350 determines whether a minimum value out of diffC, diffN, and diffP is diffC.

Here, a fact that diffC≈0 is satisfied indicates that the object is not moved during the detection period for CurQ1, CurQ2, CurQ3, and CurQ4. In a case of satisfying diffC≈0, the object is actually moved, but in a case where diffC is the minimum value, it is deemed that the object is not moved for convenience of processing.

In a case of determining that the object is moved during the detection periods for CurQ1, CurQ2, CurQ3, and CurQ4, the movement determination unit 350 determines whether diffN is a minimum value. Here, a fact that diffN is minimal indicates that the object is moved during the detection periods for CurQ1 and CurQ2 and the object is not moved during the detection periods for CurQ3 and CurQ4. More strictly, indicated is the fact that a moved amount of the object during the detection periods for CurQ1 and CurQ2 is relatively large, and a moved amount during the detection periods for CurQ3 and CurQ4 is relatively small. Additionally, a fact that diffP is a minimum value indicates that the object is moved during the detection periods for CurQ3 and CurQ4 and the object is not moved during the detection periods for CurQ1 and CurQ2. The movement determination unit 350 generates a determination result DECxy and supplies the same to the switch ranging calculation unit 360.

The switch ranging calculation unit 360 calculates, for each pixel, a distance d on the basis of the determination result DECxy. In a case of determining that diffC≈0 or diffC is the minimum value, the switch ranging calculation unit 360 substitutes CurQ1, CurQ2, CurQ3, and CurQ4 into the Expression 1 for Q1, Q2, Q3 and Q4 and calculates the distance d.

Additionally, in a case of determining that diffN is a minimum value, the switch ranging calculation unit 360 substitutes NextQ1, NextQ2, CurQ3, and CurQ4 into the Expression 1 for Q1, Q2, Q3, and Q4, and calculates the distance d as to a focused pixel. Furthermore, CurQ1 and CurQ2 are discarded without being used for ranging. The reason is that it is determined that the object is moved within the detection periods for the received light quantities.

Additionally, in a case of determining that diffP is a minimum value, the switch ranging calculation unit 360 substitutes CurQ1, CurQ2, PrevQ3, and PrevQ4 into the Expression 1 for Q1, Q2, Q3, and Q4, and calculates the distance d. Furthermore, CurQ3 and CurQ4 are discarded without being used for ranging. The reason is that it is determined that the object is moved within the detection periods for the received light quantities. Then, the switch ranging calculation unit 360 generates a depth map on the basis of the distance d calculated for each pixel, and outputs the depth map. Note that the switch ranging calculation unit 360 is an example of a ranging unit described in claims.

FIG. 8 is a diagram illustrating an exemplary data configuration of image data according to the first embodiment. This image data includes a plurality of pieces of pixel data. Each piece of the pixel data includes received light quantities Q1 and Q2 during the Q1Q2 detection period. On the other hand, each piece of the pixel data includes received light quantities Q3 and Q4 during the Q3Q4 detection period. For example, pixel data of coordinates (0, 0) within the Q1Q2 detection period includes a received light quantity Q1 of "10" and a received light quantity Q2 of "20".

Additionally, pixel data of coordinates (0, 1) includes a received light quantity Q1 of "10" and a received light quantity Q2 of "20".

FIG. 9 is a diagram illustrating an exemplary determination data according to the first embodiment. Determination data DECxy for coordinates (x, y) includes a determination result on whether any one of diffC, diffN, and diffP is a minimum value. For example, in a case where diffC≈0 or diffC is a minimum value (specifically, in a case where there is no movement), "00" is set as a determination result in binary digits. In a case where diffN is a minimum value (specifically, there is movement during the Q1Q2 detection period), binary digits "01" are set as a determination result. Additionally, in a case where diffP is a minimum value (specifically, there is movement during the Q3Q4 detection period), a value of binary digits "10" is set as a determination result DECxy.

For example, in the case where diffC≈0 or diffC is a minimum value in the coordinates (0, 1), "00" is set as a determination result of the coordinates. Additionally, in the case where diffN is a minimum value in coordinates (0, 2), "01" is set as a determination result of the coordinates.

[Exemplary Operation of Ranging Module]

Figure 10:
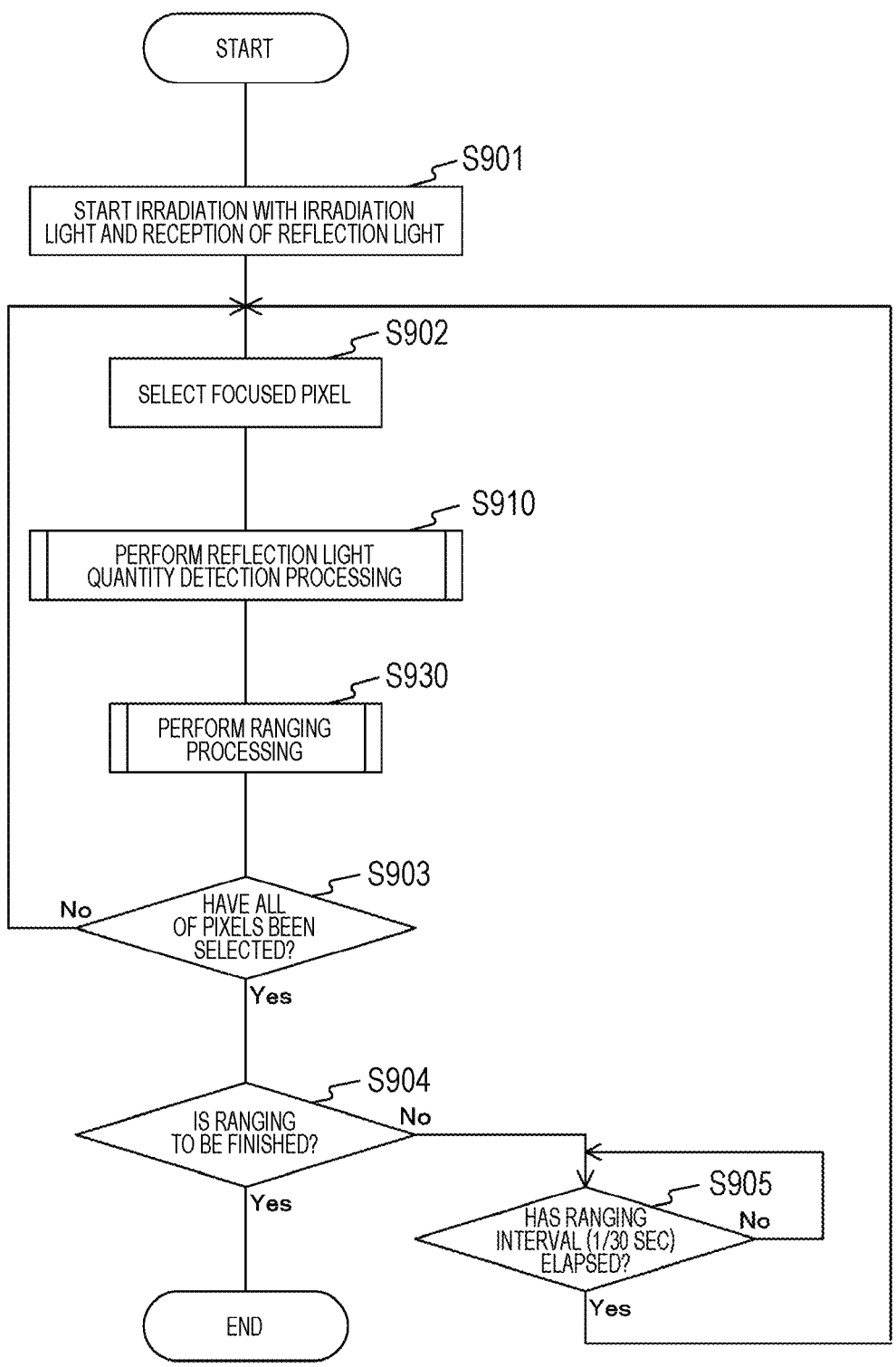
FIG. 10 is a flowchart illustrating exemplary operation of the ranging module according to the first embodiment of the present technology.

FIG. 10 is a flowchart illustrating exemplary operation of the ranging module 100 according to the first embodiment. This operation is started when the ranging module 100 is commanded to start ranging by, for example, an external circuit or a program. The ranging module 100 starts irradiation with irradiation light and reception of reflection light (step S901).

Then, the ranging module 100 selects any one of pixels inside image data as a focused pixel (step S902). The ranging module 100 performs a reflection light quantity detection processing in order to detect a received light quantity of reflection light in the focused pixel (step S910). Next, the ranging module 100 performs ranging processing in order to measure a distance as to the focused pixel (step S930). The ranging module 100 determines whether all of the pixels inside the image data have been selected (step S903).

In a case where all of the pixels have been selected (step S903: Yes), the ranging module 100 determines whether the ranging module 100 is commanded to start ranging by the external circuit or the program (step S904). In a case where the command to finish ranging is provided (step S904: Yes), the ranging module 100 finishes operation.

On the other hand, in a case where the command to finish ranging is not provided (step S904: No), the ranging module 100 determines whether a ranging interval (such as 1/30 seconds) has elapsed (step S905). In a case where the ranging interval has not elapsed yet (step S905: No), the ranging module 100 repeats step S905.

In a case where all of the pixels have not been selected (step S903: No) or in a case where the ranging interval has elapsed (step S905: Yes), the ranging module 100 repeats the processing from step S902.

Figure 11:
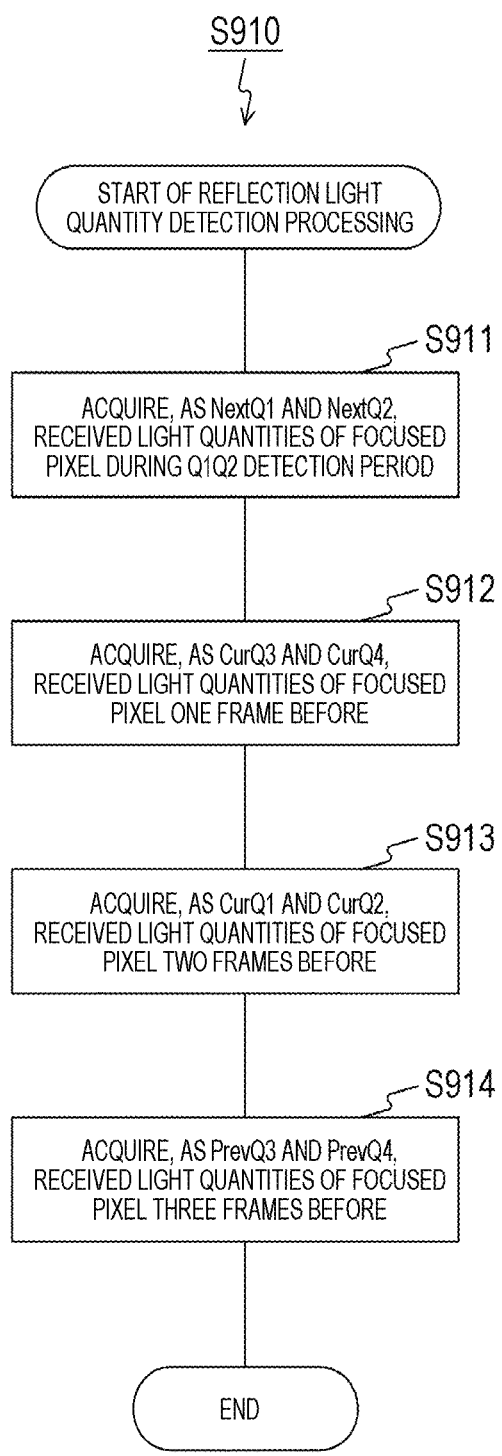
FIG. 11 is a flowchart illustrating exemplary reflection light quantity detection processing according to the first embodiment of the present technology.

FIG. 11 is a flowchart illustrating exemplary reflection light quantity measurement processing according to the first embodiment. The ranging module 100 acquires, as NextQ1 and NextQ2, received light quantities in a focused pixel during a certain Q1Q2 exposure period (step S911). Additionally, the ranging module 100 acquires, as CurQ3 and CurQ4, received light quantities of the focused pixel one frame before NextQ1 and NextQ2 (step S912).

The ranging module 100 acquires, as CurQ1 and CurQ2, received light quantities of the focused pixel two frames before NextQ1 and NextQ2 (step S913). Additionally, the ranging module 100 acquires, as PrevQ3 and PrevQ4, received light quantities of the focused pixel three frames before NextQ1 and NextQ2 (step S914). After step S914, the ranging module 100 finishes the reflection light quantity detection processing.

Figure 12:
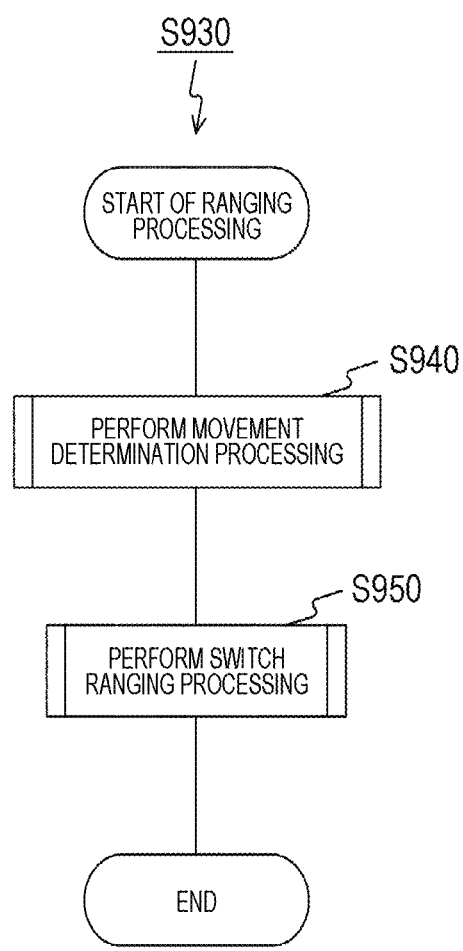
FIG. 12 is a flowchart illustrating exemplary ranging processing according to the first embodiment of the present technology.

FIG. 12 is a flowchart illustrating exemplary ranging processing according to the first embodiment. The ranging module 100 executes movement determination processing (step S940) in order to determine whether an object is moved, and executes switch ranging processing (step S950) in order to measure a distance on the basis of the determination result. After step S950, the ranging module 100 finishes the ranging processing.

Figure 13:
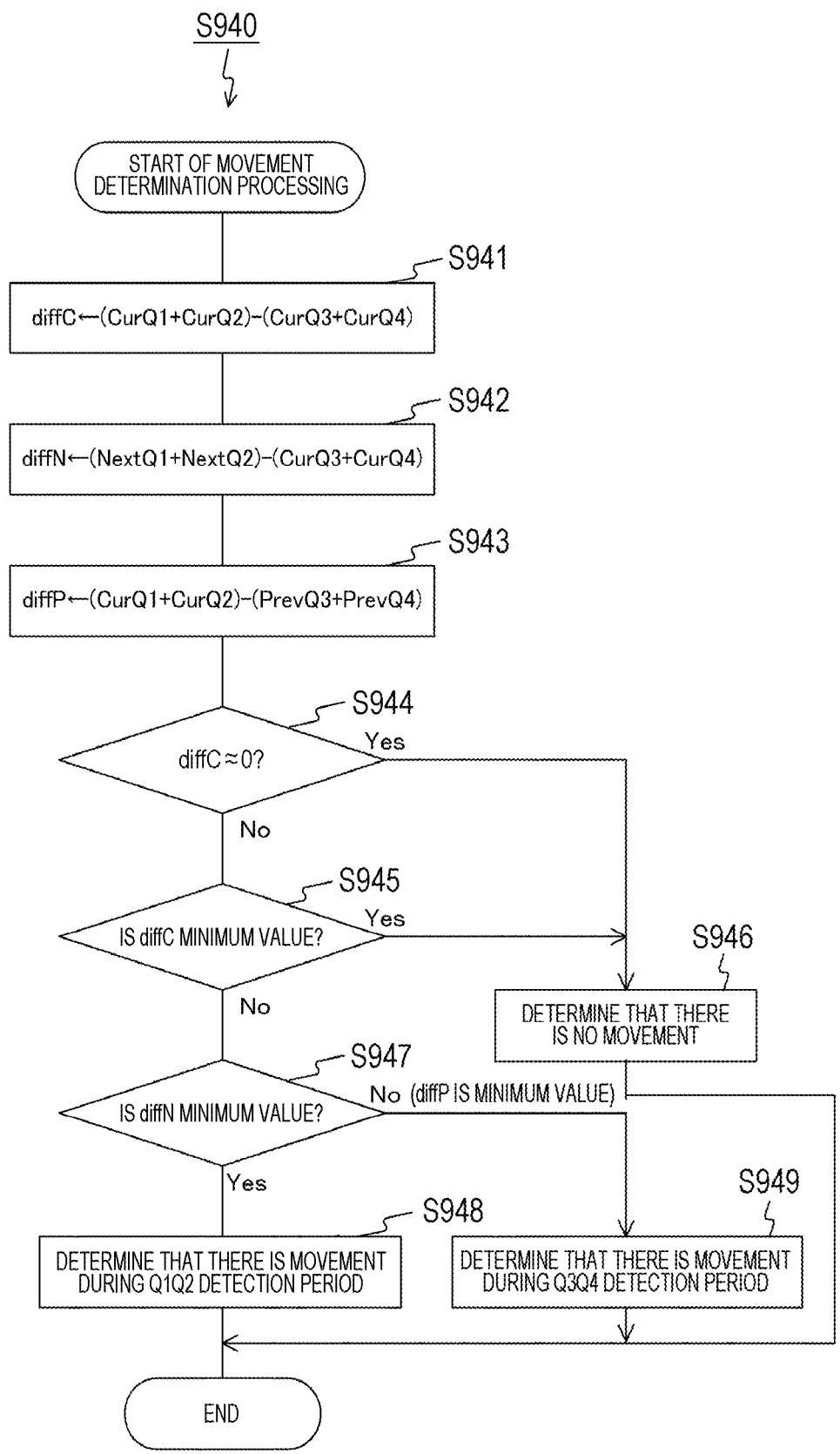
FIG. 13 is a flowchart illustrating exemplary movement determination processing according to the first embodiment of the present technology.

FIG. 13 is a flowchart illustrating exemplary movement determination processing according to the first embodiment. The ranging module 100 calculates diffC by the Expression 2 (step S941), and calculates diffN by the Expression 3 (step S942). Additionally, the ranging module 100 calculates diffP by the Expression 4 (step S943).

The ranging module 100 determines whether diffC≈0 is satisfied (step S944). In a case of not satisfying diffC≈0 (step S944: No), the ranging module 100 determines whether diffC is a minimum value (step S945). In a case of diffC≈0 is satisfied (step S944: Yes), or in a case where diffC is a minimum value (step S945: Yes), the ranging module 100 sets "00" as a determination result and determines that the object is not moved in a focused pixel (step S946).

In a case where diffC is not the minimum value (step S945: No), the ranging module 100 determines whether diffN is a minimum value (step S947). In a case where diffN is the minimum value (step S947: Yes), the ranging module 100 sets "01" as a determination result and determines, for the focused pixel, that there is movement during the Q1Q2 detection period (step S948). On the other hand, in a case where diffP is a minimum value (step S947: No), the ranging module 100 sets "10" as a determination result and determines that there is movement in the focused pixel during the Q3Q4 detection period (step S949). After step S946, S948, or S949, the ranging module 100 finishes the movement determination processing.

Figure 14:
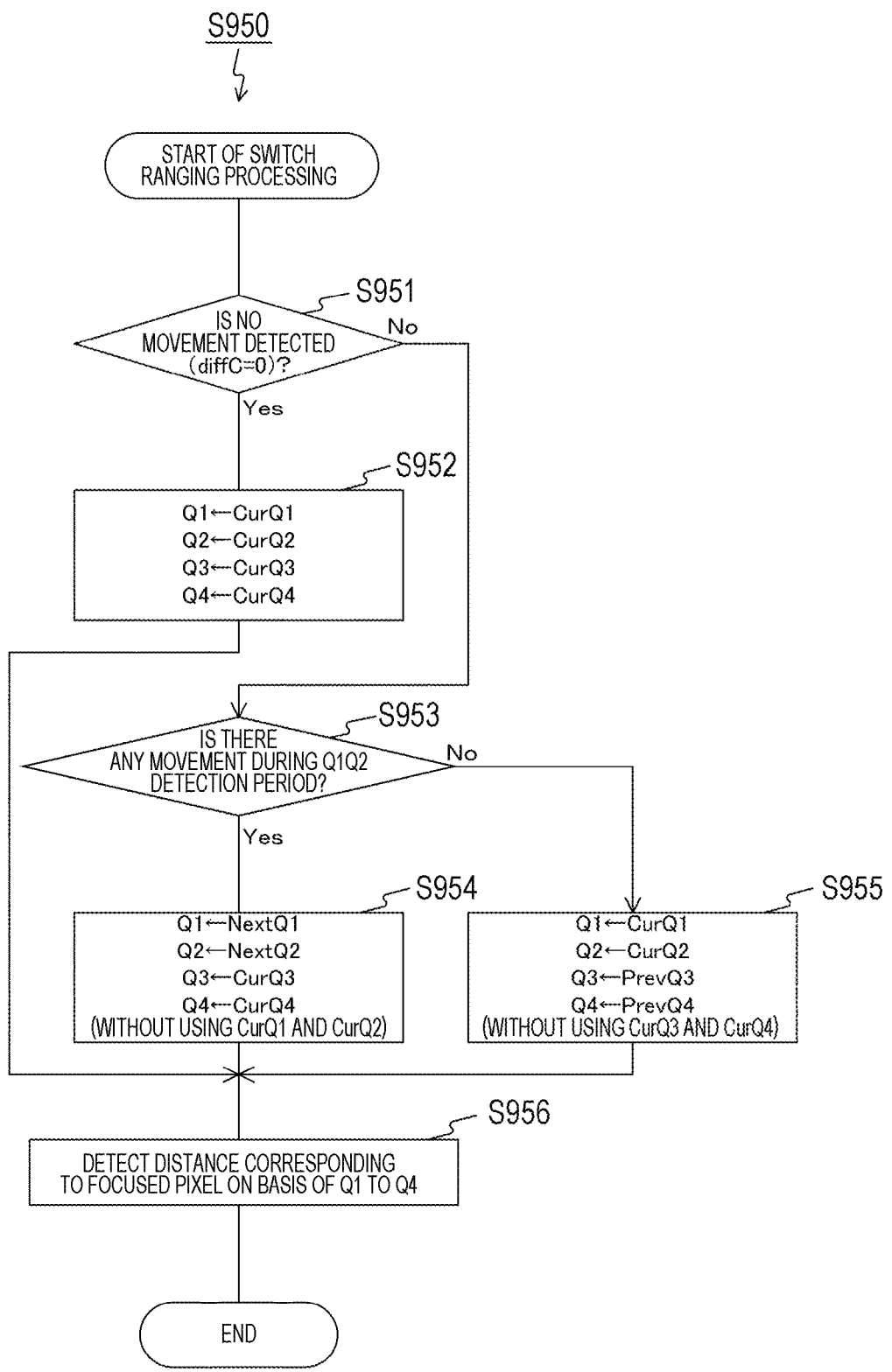
FIG. 14 is a flowchart illustrating exemplary operation of switch ranging processing according to the first embodiment of the present technology.

FIG. 14 is a flowchart illustrating exemplary operation of the switch ranging processing according to the first embodiment. The ranging module 100 determines whether an object is not moved in the focused pixel (specifically, diffC≈0 or the like) (step S951). In a case where the object is not moved in the focused pixel (step S951: Yes), the ranging module 100 substitutes CurQ1, CurQ2, CurQ3 and CurQ4 for Q1, Q2, Q3 and Q4 (step S952).

In a case where the object is moved in the focused pixel (step S951: No), the ranging module 100 determines whether it is determined that there is any movement during the Q1Q2 detection period (specifically, diffN is a minimum value) (Step S953). In a case where there is movement during the Q1Q2 detection period (step S953: Yes), the ranging module 100 substitutes NextQ1, NextQ2, CurQ3, and CurQ4 for Q1, Q2, Q3 and Q4. CurQ1 and CurQ2 are discarded without being used for ranging (step S954).

On the other hand, in a case where there is movement during the Q3Q4 detection period (step S953: No), the ranging module 100 substitutes CurQ1, CurQ2, PrevQ3 and PrevQ4 for Q1, Q2, Q3 and Q4. CurQ3 and CurQ4 are discarded without being used for ranging (step S955). Then, after step S952, S954, or S955, the ranging module 100 measures a distance corresponding to the focused pixel on the basis of Q1 to Q4 by using Expression 1 (step S956). After step S956, the ranging module 100 finishes the switch ranging processing.

Figure 15:
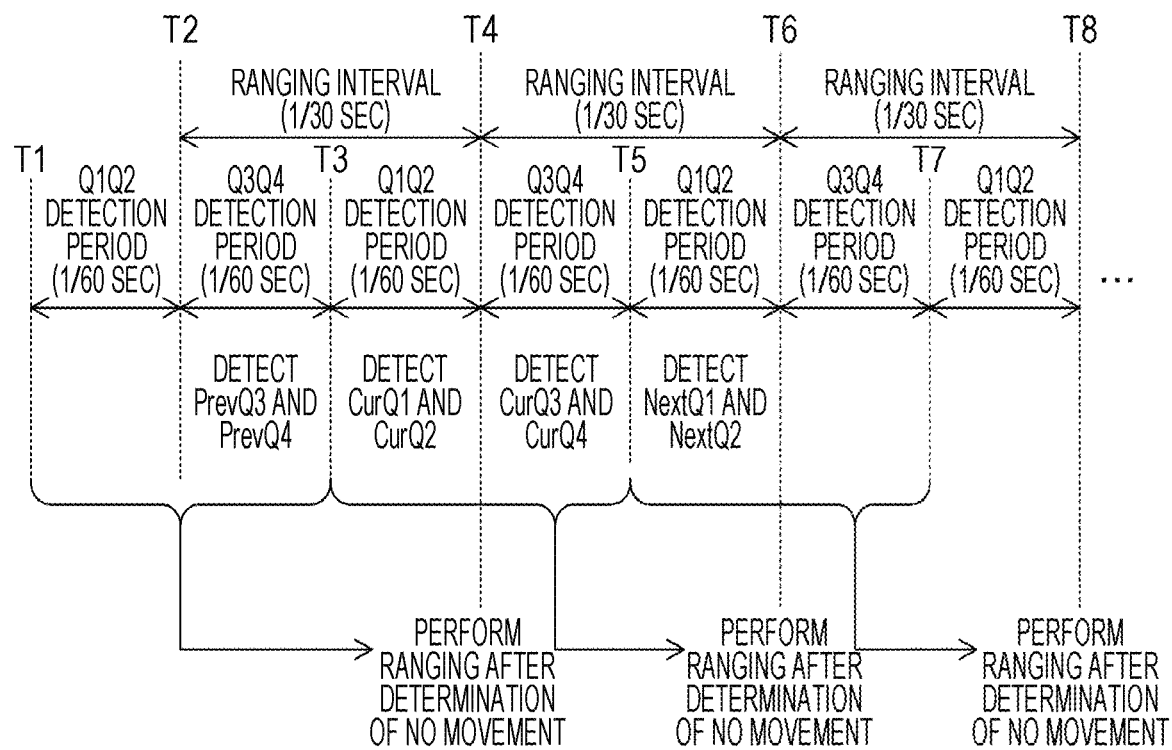
FIG. 15 is a timing chart illustrating an exemplary ranging method in a case where an object is not moved according to the first embodiment of the present technology.

FIG. 15 is a timing chart illustrating an exemplary ranging method in a case where an object is not moved according to the first embodiment. For example, the pixel circuit 230 detects received light quantities CurQ1 and CurQ2 within the Q1Q2 detection period from a timing T3 to a timing T4 Then, the pixel circuit 230 detects received light quantities CurQ3 and CurQ4 within the Q3Q4 detection period from the timing T4 to a timing T5. The movement determination unit 350 calculates diffC by the Expression 2 on the basis of these received light quantities. In a case where the object is not moved, diffC≈0 is satisfied. In this case, the switch ranging calculation unit 360 substitutes CurQ1, CurQ2, CurQ3, and CurQ4 into the Expression 1 for Q1, Q2, Q3, and Q4, and calculates a distance d. In the following procedure, as far as the object is stationary, the distance d is calculated every ⅟30 seconds in a similar method.

FIG. 16 is a timing chart illustrating an exemplary ranging method in a case where an object is moved according to the first embodiment. "a" in the drawing illustrates an exemplary ranging method in a case where the object is moved within the Q1Q2 detection period, and "b" in the drawing illustrates an exemplary ranging method in a case where the object is moved within the Q3Q4 detection period.

In a case where the object is moved at a timing T31 within the Q1Q2 detection period, neither diffC≈0 nor diffP≈0 is satisfied, and diffN becomes a minimum value. In this case, the ranging module 100 measures a distance on the basis of NextQ1, NextQ2, CurQ3, and CurQ4. CurQ1 and CurQ2 are discarded without being used. Meanwhile, in a case where the object is stationary, NextQ1 and NextQ2 are also used in next ranging.

Additionally, in a case where the object is moved at a timing T41 within the Q3Q4 detection period, neither diffC≈0 Nor diffN≈0 is satisfied, and diffP becomes a minimum value. In this case, the ranging module 100 measures a distance on the basis of CurQ1, CurQ2, PrevQ3 and PrevQ4. CurQ3 and CurQ4 are not used and are discarded. Meanwhile, in the case where the object is stationary, PrevQ3 and PrevQ4 are data used also in previous ranging.

Thus, according to the first embodiment of the present technology, the ranging module 100 measures a distance on the basis of received light quantities within a detection period during which it is determined that the object is not moved, and therefore, even in the case where the object is moved, ranging can be accurately performed irrespective of a received light quantity at that moment.

First Modified Example

In the above-described first embodiment, the ranging module 100 measures a distance on the basis of pixel data indicating a received light quantity when there is no movement, but noise may be generated in this pixel data due to various causes. The ranging module 100 of the first modified example of the first embodiment differs from the first embodiment in that a noise component in a pixel signal is reduced.

Figure 17:
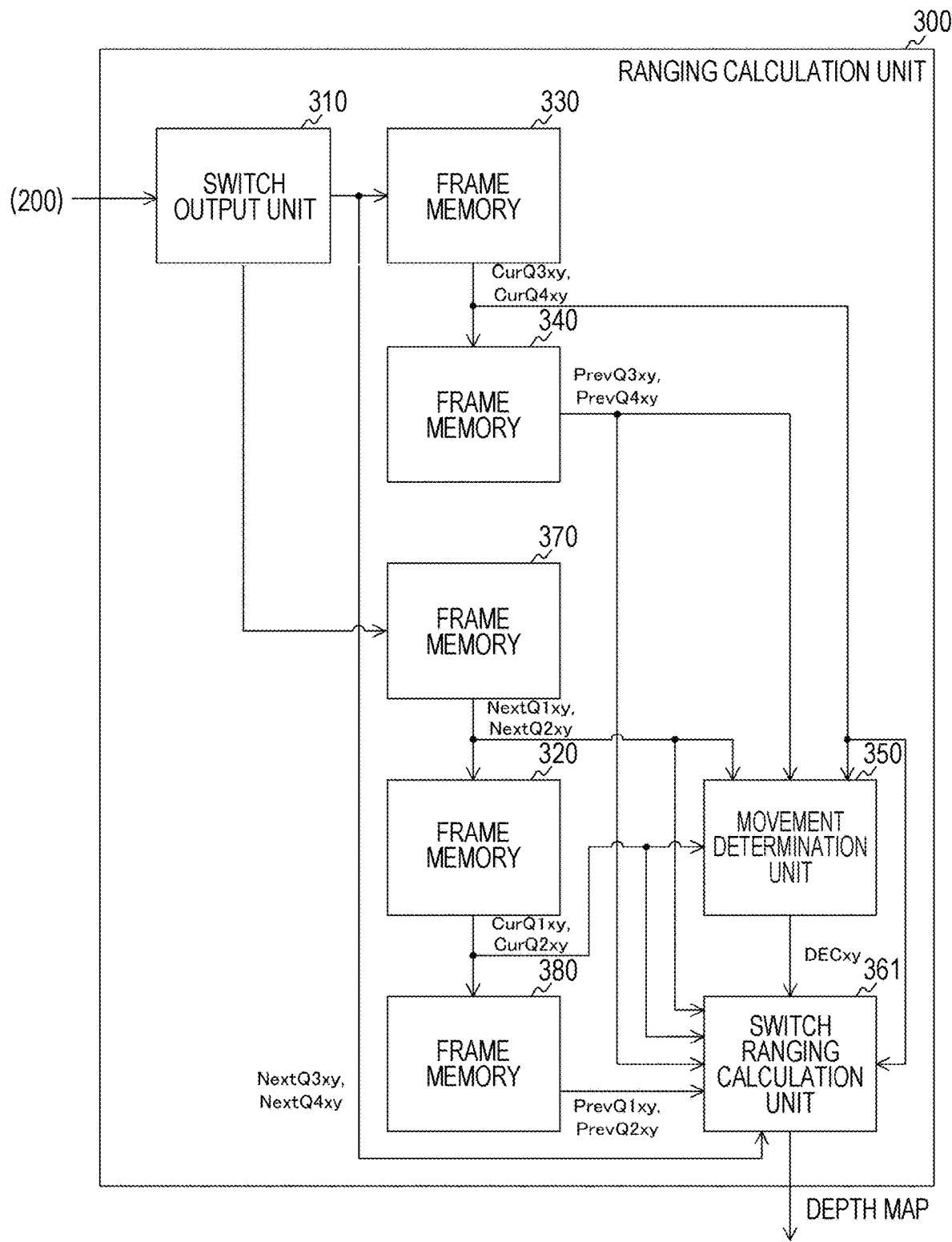
FIG. 17 is a block diagram illustrating an exemplary configuration of a ranging calculation unit according to a first modified example of the first embodiment of the present technology.

FIG. 17 is a block diagram illustrating an exemplary configuration of a ranging calculation unit 300 according to the first modified example of the first embodiment. The ranging calculation unit 300 according to the first modified example of the first embodiment differs from the first embodiment in further including frame memories 370 and 380, and including a switch ranging calculation unit 361 instead of the switch ranging calculation unit 360.

The frame memory 370 delays received light quantities Q1 and Q2 from the switch output unit 310, and outputs the same as NextQ1xy and NextQ2xy to the frame memory 320, movement determination unit 350, and switch ranging calculation unit 361. Note that the frame memory 370 is an example of a fourth delay unit described in claims.

The frame memory 380 delays CurQ1xy and CurQ2xy output from the frame memory 320, and outputs the same as PrevQ1xy and PrevQ2xy to the switch ranging calculation unit 361. Note that the frame memory 370 is an example of a fifth delay unit described in the claims.

In a case where the object is moved during the Q1Q2 detection period, the switch ranging calculation unit 361 calculates a statistical quantity (such as an average value) Ave3 of CurQ3 and NextQ3 and a statistical amount Ave4 of CurQ4 and NextQ4. Then, the switch ranging calculation unit 361 substitutes NextQ1, NextQ2, Ave3 and Ave4 into the Expression 1 for Q1, Q2, Q3, and Q4 and calculates a distance d.

Furthermore, in a case where the object is moved during the Q3Q4 detection period, the switch ranging calculation unit 361 calculates a statistical quantity (such as an average value) Ave1 of CurQ1 and PrevQ1 and a statistical quantity Ave2 of CurQ1 and PrevQ2. Then, the switch ranging calculation unit 361 substitutes AveQ1, AveQ2, PrevQ3, and Prev4 into the Expression 1 for Q1, Q2, Q3, and Q4, and calculates the distance d. Since an average value of the received light quantities is thus calculated, noise in pixel data indicating received light quantities can be suppressed.

Figure 18:
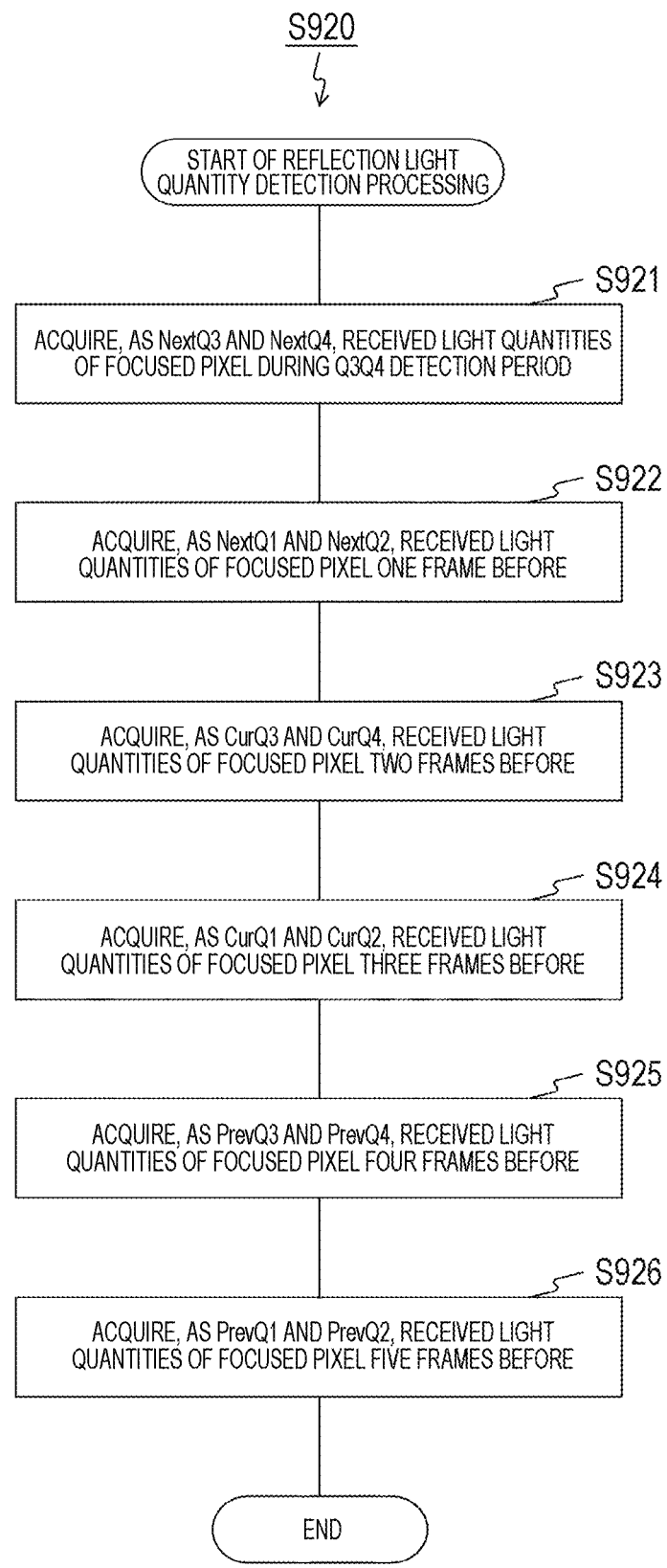
FIG. 18 is a flowchart illustrating exemplary reflection light quantity detection processing according to the first modified example of the first embodiment of the present technology.

FIG. 18 is a flowchart illustrating exemplary reflection light quantity detection processing according to the first modified example of the first embodiment. The ranging module 100 acquires, as NextQ3 and NextQ4, received light quantities of a focused pixel during a certain Q3Q4 exposure period (step S921). Additionally, the ranging module 100 acquires, as NextQ1 and NextQ2, received light quantities of the focused pixel one frame before NextQ3 and NextQ4 (step S922).

The ranging module 100 acquires, as CurQ3 and CurQ4, received light quantities of the focused pixel two frames before NextQ3 and NextQ4 (step S923). Additionally, in step S924, the ranging module 100 acquires, as CurQ1 and Cur2, received light quantities of the focused pixel three frames before NextQ3 and NextQ4.

Then, the ranging module 100 acquires, as PrevQ3 and PrevQ4, received light quantities of the focused pixel four frames before NextQ3 and NextQ4 (step S925). Additionally, the ranging module 100 acquires, as PrevQ1 and PrevQ2, received light quantities of the focused pixel five frames before NextQ3 and NextQ4 (step S926). After step S926, the ranging module 100 finishes the reflection light quantity detection processing.

Figure 19:
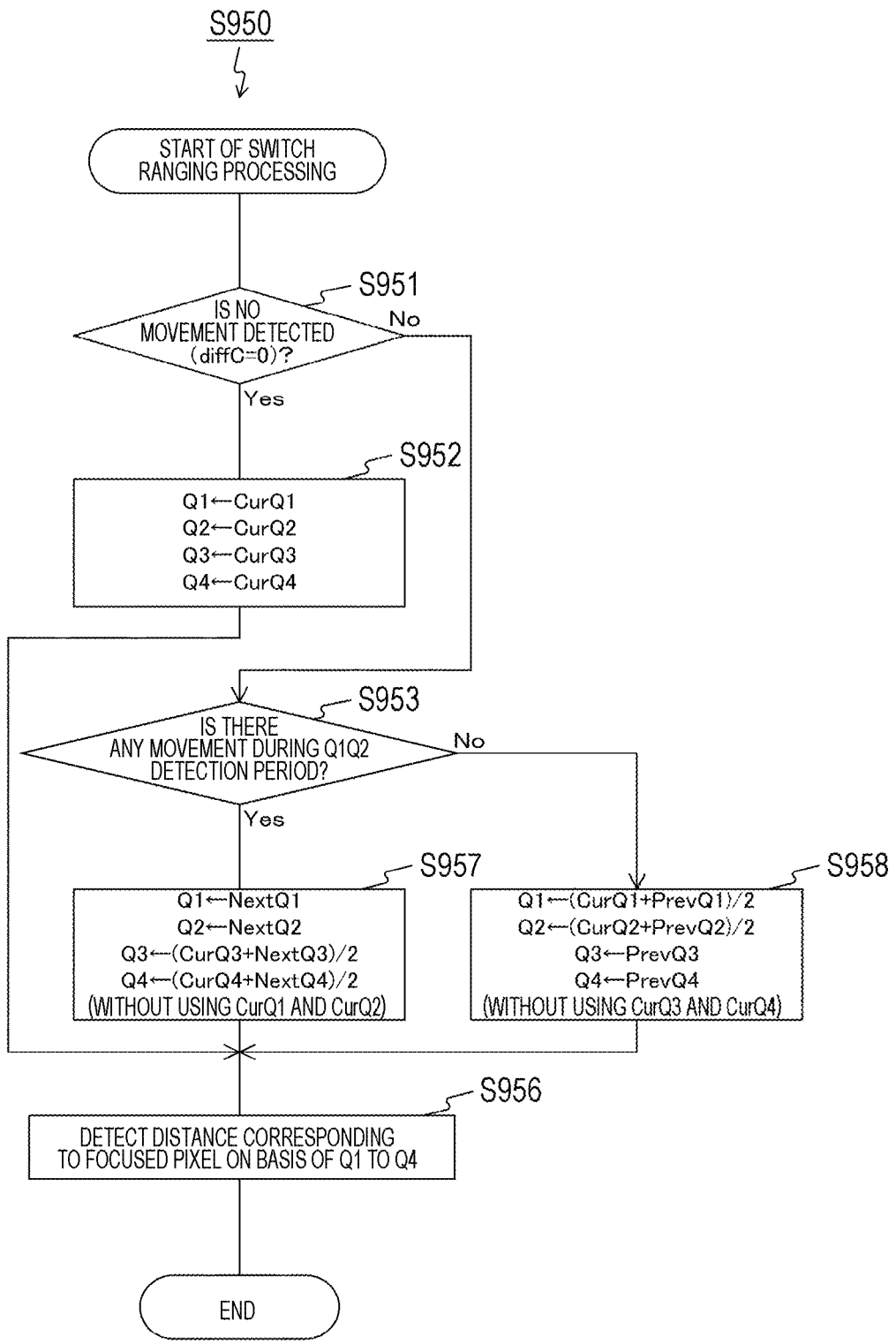
FIG. 19 is a flowchart illustrating exemplary operation of switch ranging processing according to the first modified example of the first embodiment of the present technology.

FIG. 19 is a flowchart illustrating exemplary operation of switch ranging processing according to the first modified example of the first embodiment. The switch ranging processing according to the first modified example of the first embodiment differs from the first embodiment in executing steps S957 and S958 instead of steps S954 and S955.

In a case where there is movement during the Q1Q2 detection period (step S953: Yes), the ranging module 100 substitutes NextQ1 and NextQ2 for Q1 and Q2. Additionally, the ranging module 100 substitutes an average value of CurQ3 and NextQ3 and an average value of CurQ4 and NextQ4 for Q3 and Q4. CurQ1 and CurQ2 are discarded without being used for ranging (step S957).

On the other hand, in a case where there is movement during the Q3Q4 detection period (step S953: No), the ranging module 100 substitutes an average value of CurQ1 and PrevQ1 and an average value of CurQ2 and PrevQ2 for Q1 and Q2. Additionally, the ranging module 100 substitutes PrevQ3 and PrevQ4 for Q3 and Q4. CurQ3 and CurQ4 are discarded without being used for ranging (step S958).

Meanwhile, the ranging module 100 may calculate weighted additional values instead of the average values in steps S957 and S958.

FIG. 20 is a timing chart illustrating an exemplary ranging method in a case where an object is moved according to the first modified example of the first embodiment. "a" in the drawing illustrates an exemplary ranging method in a case where the object is moved within the Q1Q2 detection period, and "b" in the drawing illustrates an exemplary ranging method in a case where the object is moved within the Q3Q4 detection period.

In a case where the object is moved at a timing T31 within the Q1Q2 detection period, diffC≈0 and diffP≈0 are not satisfied. In this case, the ranging module 100 measures a distance on the basis of an average value of NextQ1, NextQ2, CurQ3, and NextQ3 and an average value of CurQ4 and NextQ4. CurQ1 and CurQ2 are discarded without being used.

Additionally, in a case where the object is moved at a timing T41 within the Q3Q4 detection period, neither diffC≈0 nor diffN≈0 is satisfied. In this case, the ranging module 100 measures a distance on the basis of the average value of CurQ1 and PrevQ1, the average value of CurQ2 and PrevQ2, PrevQ3, and PrevQ4. CurQ3 and CurQ4 are discarded without being used.

Thus, according to the first modified example of the first embodiment of the present technology, the ranging module 100 calculates an average value of the received light quantities within a detection period during which an object is not moved, and a distance is measured on the basis of the average value, and therefore, a noise component in a received light quantity can be suppressed.

Second Modified Example

In the above-described first embodiment, the ranging module 100 determines whether an object is moved on the basis of the relational expressions of the received light quantities, such as the Expressions 2 to 4. However, the larger the number of pixels is, the more a calculation amount to determine occurrence of movement is increased, and power consumption and a circuit scale of the ranging module 100 may be increased. A second modified example of the first embodiment differs from the first embodiment in reducing the calculation amount of the ranging module 100.

Figure 21:
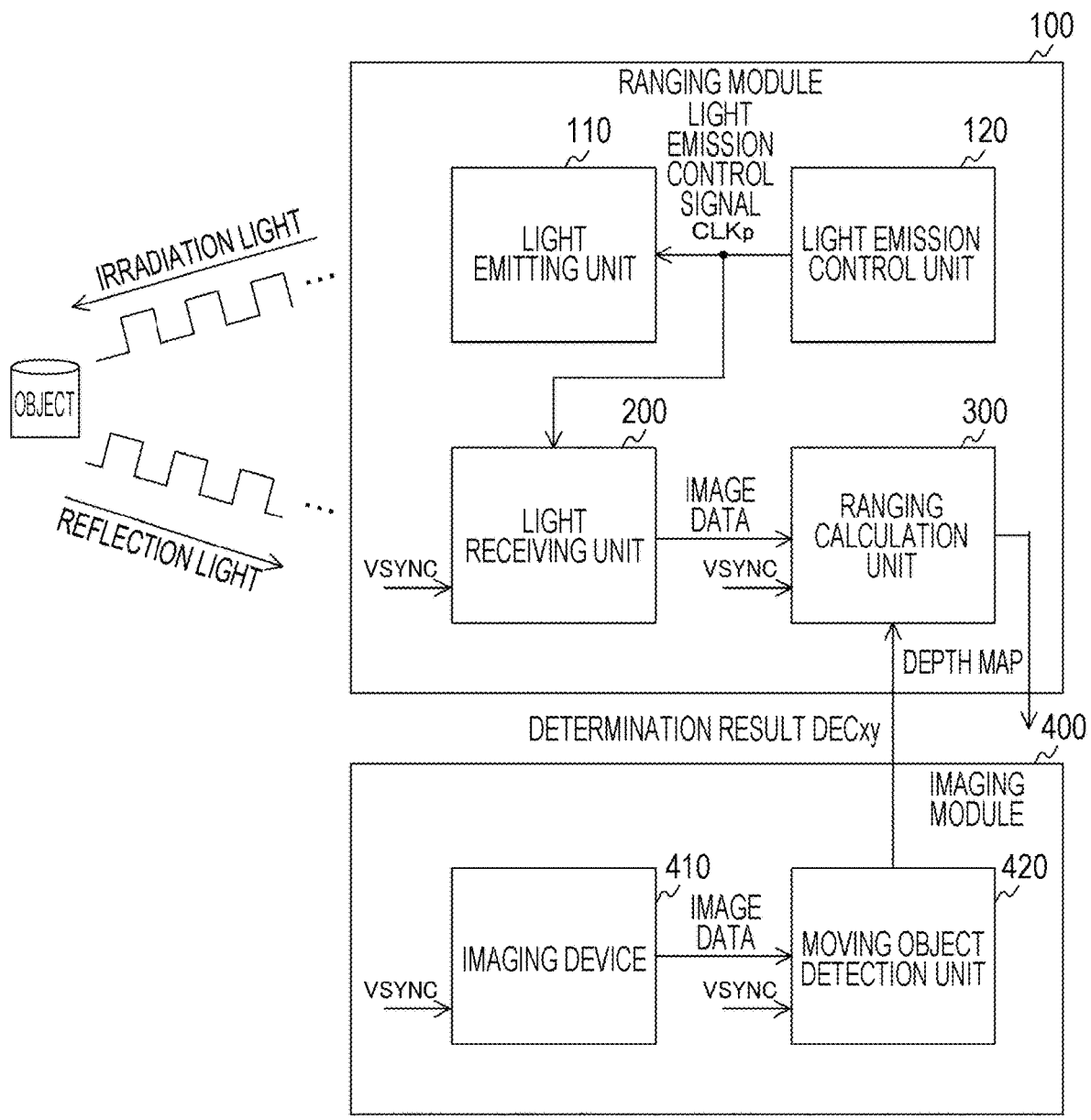
FIG. 21 is a block diagram illustrating an exemplary configuration of a ranging system according to a second modified example of the first embodiment of the present technology.

FIG. 21 is a block diagram illustrating an exemplary configuration of a ranging system according to the second modified example of the first embodiment. This ranging system includes a ranging module 100 and an imaging module 400.

The ranging module 100 of the first modified example performs ranging by the ToF method in a manner similar to the first embodiment. However, the ranging module 100 does not generate an own determination result DECxy on occurrence of movement of the object, but receives a result from the imaging module 400.

The imaging module 400 includes an imaging device 410 and a moving object detection unit 420. The imaging device 410 captures image data in synchronization with a vertical synchronization signal VSYNC. The imaging device 410 supplies the image data to the moving object detection unit

420. Note that the imaging device 410 is an example of an imaging unit described in the claims.

The moving object detection unit 420 detects a moving object on the basis of the image data from the imaging device 410. The moving object detection unit 420 detects the moving object by using, for example, a background difference method, an inter-frame difference method, or the like. In the background difference method, a background preliminarily acquired is compared with image data to be detected, and a portion where a difference between pixel values corresponding to each other exceeds a threshold value is detected as a moving object. The moving object detection unit 420 generates a determination result DECxy from a detection result of the moving object, and supplies the same to the ranging calculation unit 300. Note that the moving object detection unit 420 is an example of a determination unit described in the claims.

Meanwhile, the imaging device 410 and the moving object detection unit 420 are arranged inside the imaging module 400, but at least one of thereof may be arranged in the ranging module 100.

Figure 22:
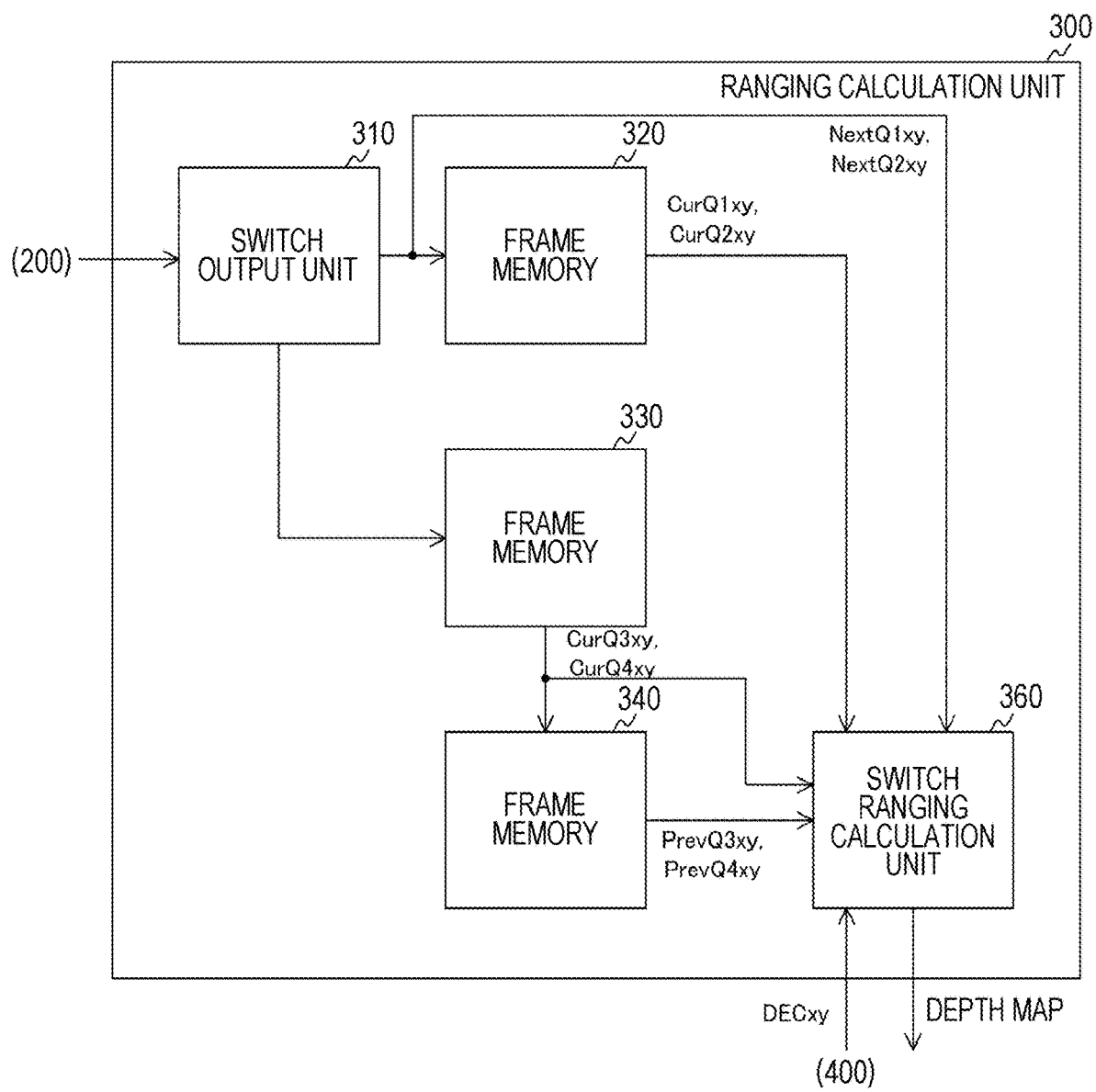
FIG. 22 is a block diagram illustrating an exemplary configuration of a ranging calculation unit according to the second modified example of the first embodiment of the present technology.

FIG. 22 is a block diagram illustrating an exemplary configuration of a ranging calculation unit 300 according to the second modified example of the first embodiment. The ranging calculation unit 300 according to the second modified example of the first embodiment differs from the first embodiment in not including the movement determination unit 350. The switch ranging calculation unit 360 of the second modified example performs ranging by using the determination result DECxy from the imaging module 400.

Thus, according to the second modified example of the first embodiment of the present technology, the imaging module 400 determines occurrence of movement, and the ranging module 100 performs ranging by using the determination result, and therefore, a calculation amount of the ranging module 100 to determine occurrence of movement can be reduced.

2. Second Embodiment

In a first embodiment described above, a ranging module 100 delays image data by using three frame memories, and performs ranging by using a received light quantity before delay (such as NextQ1) and a received light quantity after the delay (such as CurQ1). However, the larger the number of pixels of image data is, the more a total capacity of the frame memories may be increased. A ranging module 100 according to a second embodiment differs from the first embodiment in reducing a capacity of a memory.

Figure 23:
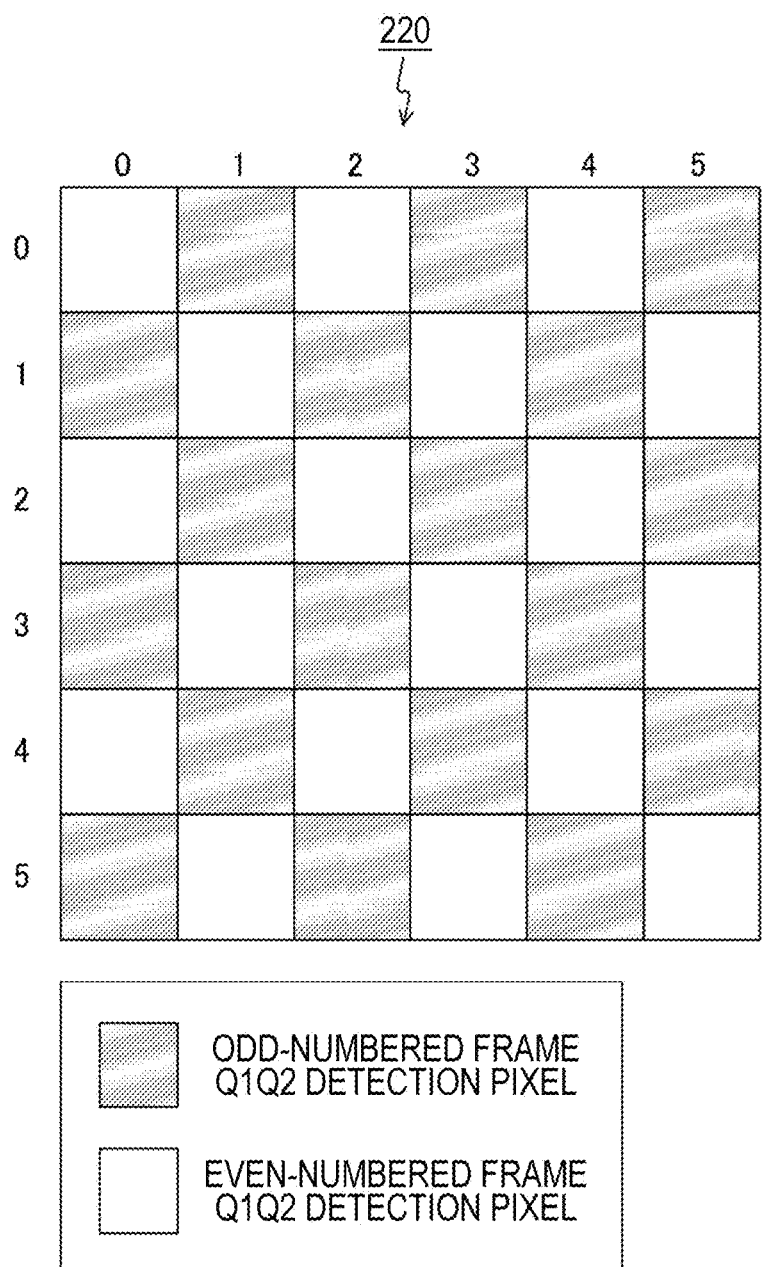
FIG. 23 is a plan view illustrating an exemplary pixel array unit according to a second embodiment of the present technology.

FIG. 23 is a plan view illustrating an exemplary pixel array unit 220 according to the second embodiment. In the pixel array unit 220 according to the second embodiment, odd-numbered frame Q1Q2 detection pixels and even-numbered frame Q1Q2 detection pixels are arranged. These two kinds of pixels are arranged in positions such that a checkered flag pattern is formed in a case where one kind is represented in gray and the other in white. In the drawing, gray pixels represent odd-numbered frame Q1Q2 detection pixels, and white pixels represent even-numbered frame Q1Q2 detection pixels. Note that the gray pixels in the drawing are only colored in gray for convenience of description of the arrangement, and no gray color filter or the like is provided in actual implementation.

The odd-numbered frame Q1Q2 detection pixel detects received light quantities Q1 and Q2 in odd numbered image data (frame) and detects received light quantities Q3 and Q4 in an even-numbered frame. In the following, the odd-numbered frame will be referred to as an "odd-numbered frame" and the even-numbered frame will be referred to as an "even-numbered frame". On the other hand, the even-numbered frame Q1Q2 detection pixel detects received light quantities Q3 and Q4 in an odd numbered frame and detects received light quantities Q1 and Q2 in an even-numbered frame.

In the actual implementation, each of the odd-numbered frame Q1Q2 detection pixel and the even-numbered frame Q1Q2 detection pixel has a circuit configuration similar to that of a pixel circuit 230. A row scanning circuit 210 controls these pixels and causes the same to detect received light quantities at different timings.

Note that the odd-numbered frame Q1Q2 detection pixel is an example of a first pixel described in the claims, and the even-numbered frame Q1Q2 detection pixel is an example of a second pixel described in the claims.

Additionally, the odd-numbered frame Q1Q2 detection pixels and the even-numbered frame Q1Q2 detection pixels are arranged in the positions such that a checkered flag pattern is formed, but arrangement is not limited thereto. For example, the odd-numbered frame Q1Q2 detection pixels may be arrayed in one of an odd-numbered line and an even-numbered line and the even-numbered frame Q1Q2 detection pixels may be arrayed in the other thereof. Also, only one in each of the odd-numbered frame Q1Q2 detection pixel and the even-numbered frame Q1Q2 detection pixel may be provided.

FIG. 24 is a timing chart illustrating an exemplary received light quantity detection method according to the second embodiment. "a" in the drawing illustrates exemplary detection method of an odd-numbered frame Q1Q2 detection pixel, and "b" in the drawing illustrates an exemplary detection method of an even-numbered frame Q1Q2 detection pixel.

The odd-numbered frame Q1Q2 detection pixel detects received light quantities Q1 and Q2 during a period from a timing T1 to a timing T2. On the other hand, the even-numbered frame Q1Q2 detection pixel detects received light quantities Q3 and Q4 during this period. Furthermore, the odd-numbered frame Q1Q2 detection pixel detects received light quantities Q3 and Q4 during a period from the timing T2 to a timing T3. On the other hand, the even-numbered frame Q1Q2 detection pixel detects received light quantities Q1 and Q2 during this period. Thus, the even-numbered frame Q1Q2 detection pixel detects the received light quantities Q3 and Q4 during the period in which the odd-numbered frame Q1Q2 detection pixel detects the received light quantities Q1 and Q2. Additionally, the even-numbered frame Q1Q2 detection pixel detects the received light quantities Q1 and Q2 during the period in which the odd-numbered frame Q1Q2 detection pixel detects the received light quantities Q3 and Q4.

Figure 25:
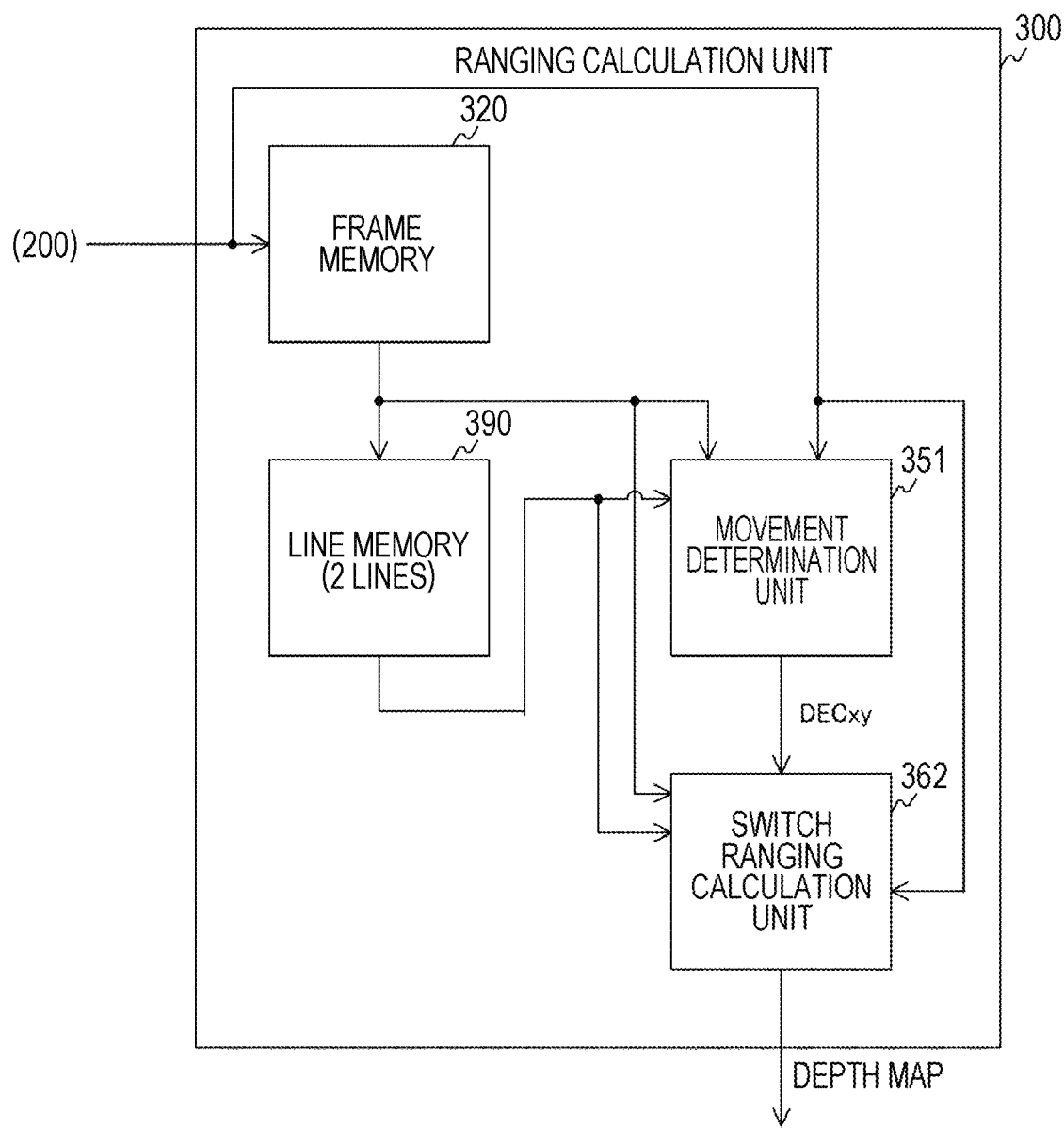
FIG. 25 is a block diagram illustrating an exemplary configuration of a ranging calculation unit according to the second embodiment of the present technology.

FIG. 25 is a block diagram illustrating an exemplary configuration of a ranging calculation unit 300 according to the second embodiment. The ranging calculation unit 300 according to the second embodiment differs from that of the first embodiment in including a line memory 390 instead of frame memories 330 and 340. Additionally, another difference from the first embodiment is including a movement determination unit 351 and a switch ranging calculation unit 362 instead of a movement determination unit 350 and a switch ranging calculation unit 360.

The line memory 390 delays, by two lines, image data that has been delayed by the frame memory 320, and outputs the delayed image data to the movement determination unit 351 and the switch ranging calculation unit 362.

The movement determination unit 351 sequentially focuses on pixels in each frame. In a case where a focused pixel is an odd-numbered frame Q1Q2 detection pixel in an odd-numbered frame, the movement determination unit 351 acquires, as CurQ1 and CurQ2, received light quantities Q1 and Q2 of the focused pixel from the line memory 390. Furthermore, the movement determination unit 351 acquires, as UpQ3, UpQ4, LeftQ3, LeftQ4, RightQ3, and RightQ4, received light quantities of upper, left, and right adjacent pixels (even-numbered frame Q1Q2 detection pixels) of the focused pixel from the line memory 390. Additionally, the movement determination unit 351 acquires, as DownQ3 and DownQ4, received light quantities of a lower adjacent pixel of the focused pixel (even-numbered frame Q1Q2 detection pixel).

Additionally, the movement determination unit 351 acquires, as CurQ3 and CurQ4, received light quantities of the focused pixel in a previous even-numbered frame from the frame memory 320. Furthermore, the movement determination unit 351 acquires, as UpQ1, UpQ2, DownQ1, DownQ2, LeftQ1, LeftQ2, RightQ1, and RightQ2, received light quantities of the upper, lower, right, and left adjacent pixels of the focused pixel from the frame memory 320.

Then, the movement determination unit 351 calculates diffC by Expression 2, and calculates a difference such as diffL1 by the following Expressions.

$$\text{diff}L1 = (\text{Cur}Q1 + \text{Cur}Q2) - (\text{Left}Q3 + \text{Left}Q4) \quad \text{Expression 5}$$

$$\text{diff}R1 = (\text{Cur}Q1 + \text{Cur}Q2) - (\text{Right}Q3 + \text{Right}Q4) \quad \text{Expression 6}$$

$$\text{diff}U1 = (\text{Cur}Q1 + \text{Cur}Q2) - (\text{Up}Q3 + \text{Up}Q4) \quad \text{Expression 7}$$

$$\text{diff}D1 = (\text{Cur}Q1 + \text{Cur}Q2) - (\text{Down}Q3 + \text{Down}Q4) \quad \text{Expression 8}$$

$$\text{diff}L2 = (\text{Left}Q1 + \text{Left}Q2) - (\text{Cur}Q3 + \text{Cur}Q4) \quad \text{Expression 9}$$

$$\text{diff}R2 = (\text{Right}Q1 + \text{Right}Q2) - (\text{Cur}Q3 + \text{Cur}Q4) \quad \text{Expression 10}$$

$$\text{diff}U2 = (\text{Up}Q1 + \text{Up}Q2)(\text{Cur}Q3 + \text{Cur}Q4) \quad \text{Expression 11}$$

$$\text{diff}D2 = (\text{Down}Q1 + \text{Down}Q2) - (\text{Cur}Q3 + \text{Cur}Q4) \quad \text{Expression 12}$$

The movement determination unit 351 obtains a minimum value out of the differences (diffC and the like) calculated by the Expression 2 and Expressions 5 to 12. A fact that diffC≈0 or diffC is a minimum value indicates that the object is not moved. Additionally, a fact that any one of diffL1, diffR1, diffU1, and diffD1 is a minimum value indicates that the object is moved in the focused pixel during the Q3Q4 detection period. Furthermore, a fact that any one of diffL2, diffR2, diffU2 and diffD2 is a minimum value indicates that the object is moved in the focused pixel during the Q1Q2 detection period. The movement determination unit 351 supplies the switch ranging calculation unit 362 with a determination result DECxy indicating the minimum value of the difference. For example, a 4-bit determination result DECxy indicating any one of nine differences is generated.

In a case where the object is not moved, the switch ranging calculation unit 362 measures a distance d on the basis of CurQ1, CurQ2, CurQ3, and CurQ4 in a manner similar to the first embodiment.

Furthermore, in a case where the object is moved during the Q3Q4 detection period, the switch ranging calculation unit 362 measures the distance d on the basis of CurQ1, CurQ2, and the received light quantities of an adjacent pixel corresponding to a minimum value of the difference. For example, in a case where diffL1 is a minimum value, LeftQ3 and LeftQ4 in the Expression 5 are used.

Additionally, in a case where the object is moved during the Q1Q2 detection period, the switch ranging calculation unit 362 measures a distance d on the basis of CurQ3, CurQ4, and received light quantities of an adjacent pixel corresponding to a minimum value of the difference. For example, in a case where diffL2 is a minimum value, LeftQ1 and LeftQ2 in the Expression 9 are used.

Next, in a case where an even-numbered frame Q1Q2 detection pixel is focused in an odd-numbered frame, the movement determination unit 351 acquires, as CurQ3 and CurQ4, received light quantities Q3 and Q4 of the focused pixel from the line memory 390. Additionally, the movement determination unit 351 acquires, as UpQ1, UpQ2, LeftQ1, LeftQ2, RightQ1, and RightQ2, received light quantities of upper, left, and right adjacent pixels of the focused pixel (odd-numbered frame Q1Q2 detection pixels) from the line memory 390. Furthermore, the movement determination unit 351 acquires, as DownQ1 and DownQ2, received light quantities of a lower adjacent pixel of the focused pixel (odd-numbered frame Q1Q2 detection pixel) from a current odd-numbered frame.

Furthermore, the movement determination unit 351 acquires, as CurQ1 and CurQ2, received light quantities of the focused pixel in a previous even-numbered frame from the frame memory 320. Additionally, the movement determination unit 351 acquires, as UpQ3, UpQ4, DownQ3, DownQ4, LeftQ3, LeftQ4, RightQ3, and RightQ4, received light quantities of the upper, lower, right, and left adjacent pixels of the focused pixel from the frame memory 320.

In an even-numbered frame, the movement determination unit 351 performs processing corresponding to processing in an odd-numbered frame. For example, in a case of focusing on an odd-numbered frame Q1Q2 detection pixel in an even-numbered frame, received light quantities of the focused pixel are acquired as CurQ3 and CurQ4, and in a case of focusing on an even-numbered frame Q1Q2 detection pixel, received light quantities of the focused pixel are acquired as CurQ1 and CurQ2.

Thus, while memories for three frames are required in the first embodiment, only memories for one frame and two lines are required in the second embodiment. Therefore, a total capacity of the memory can be reduced.

Figure 26:
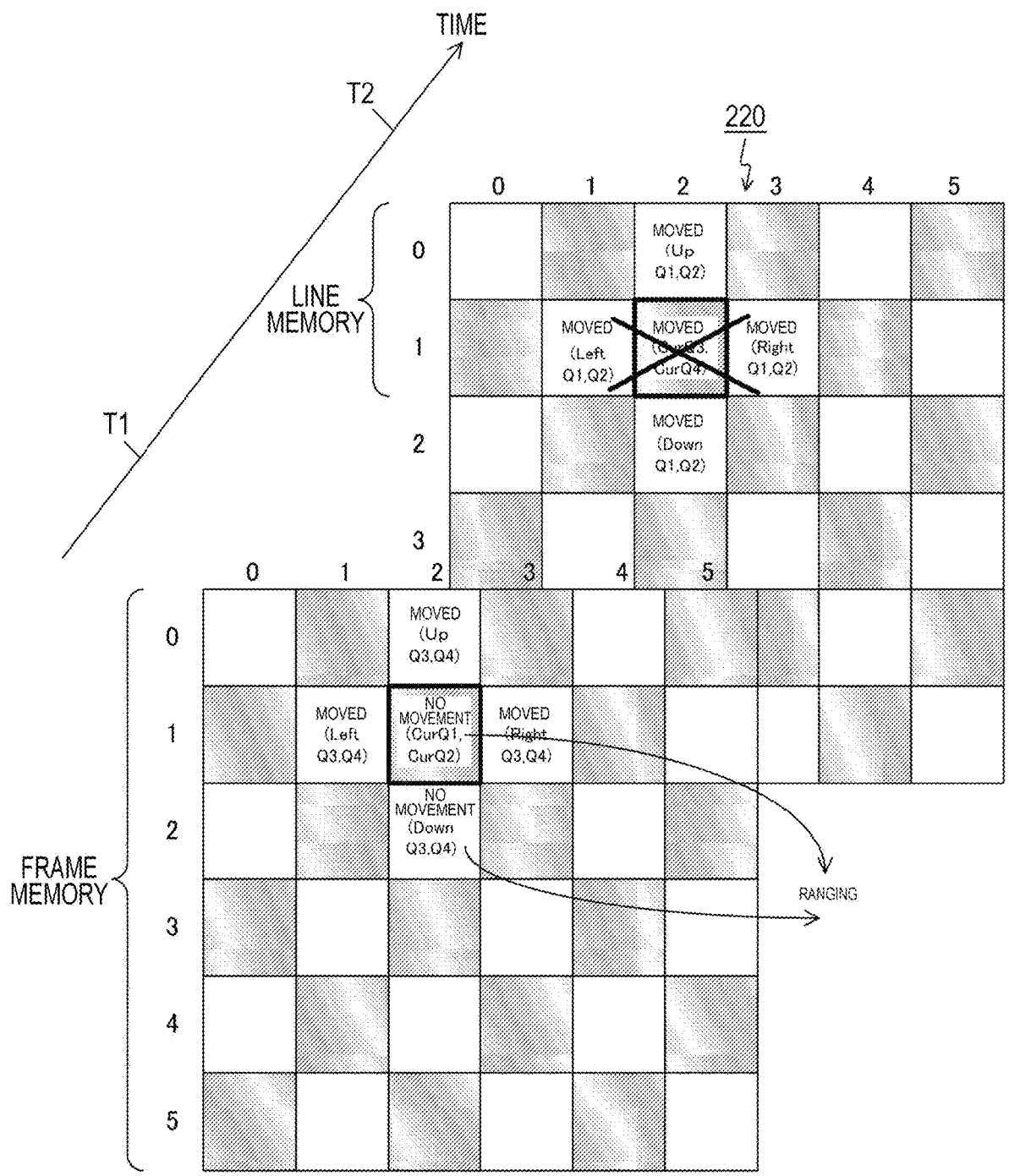
FIG. 26 is a diagram illustrating an exemplary ranging method in a case where an object is moved according to the second embodiment of the present technology.

FIG. 26 is a diagram illustrating an exemplary ranging method in a case where an object is moved according to the second embodiment. Assume that an odd-numbered frame is generated at a timing T1 and an even-numbered frame is generated at a timing T2. The movement determination unit 351 focuses on, for example, an odd-numbered frame Q1Q2 detection pixel (gray portion).

A case where diffD1 is a minimum value will be considered here. This indicates that an object is moved in the focused pixel during the Q3Q4 detection period. In this case, the switch ranging calculation unit 362 measures a distance d by using received light quantities DownQ3 and DownQ4 of an adjacent pixel having a minimum value diffD1, as well as CurQ1 and CurQ2. Since the object is moved during the Q3Q4 detection period, CurQ3 and Curq4 are discarded without being used.

FIG. 27 is a diagram illustrating an exemplary calculation method for each determination result according to the second embodiment. In a case where the object is not moved, the switch ranging calculation unit 362 measures a distance d on the basis of CurQ1, CurQ2, CurQ3, and CurQ4 in a manner similar to the first embodiment.

On the other hand, in a case where the object is moved during the Q3Q4 detection period, the switch ranging calculation unit 362 measures a distance d on the basis of CurQ1, CurQ2, and received light quantities of an adjacent pixel corresponding to a minimum value. For example, in a case where diffL1 is a minimum value, LeftQ3 and LeftQ4 are used.

Additionally, in a case where the object is moved during the Q1Q2 detection period, the switch ranging calculation unit 362 measures the distance d on the basis of CurQ3, CurQ4, and received light quantities of an adjacent pixel corresponding to a minimum value. For example, in a case where diffL2 is a minimum value, LeftQ1 and LeftQ2 are used.

Figure 28:
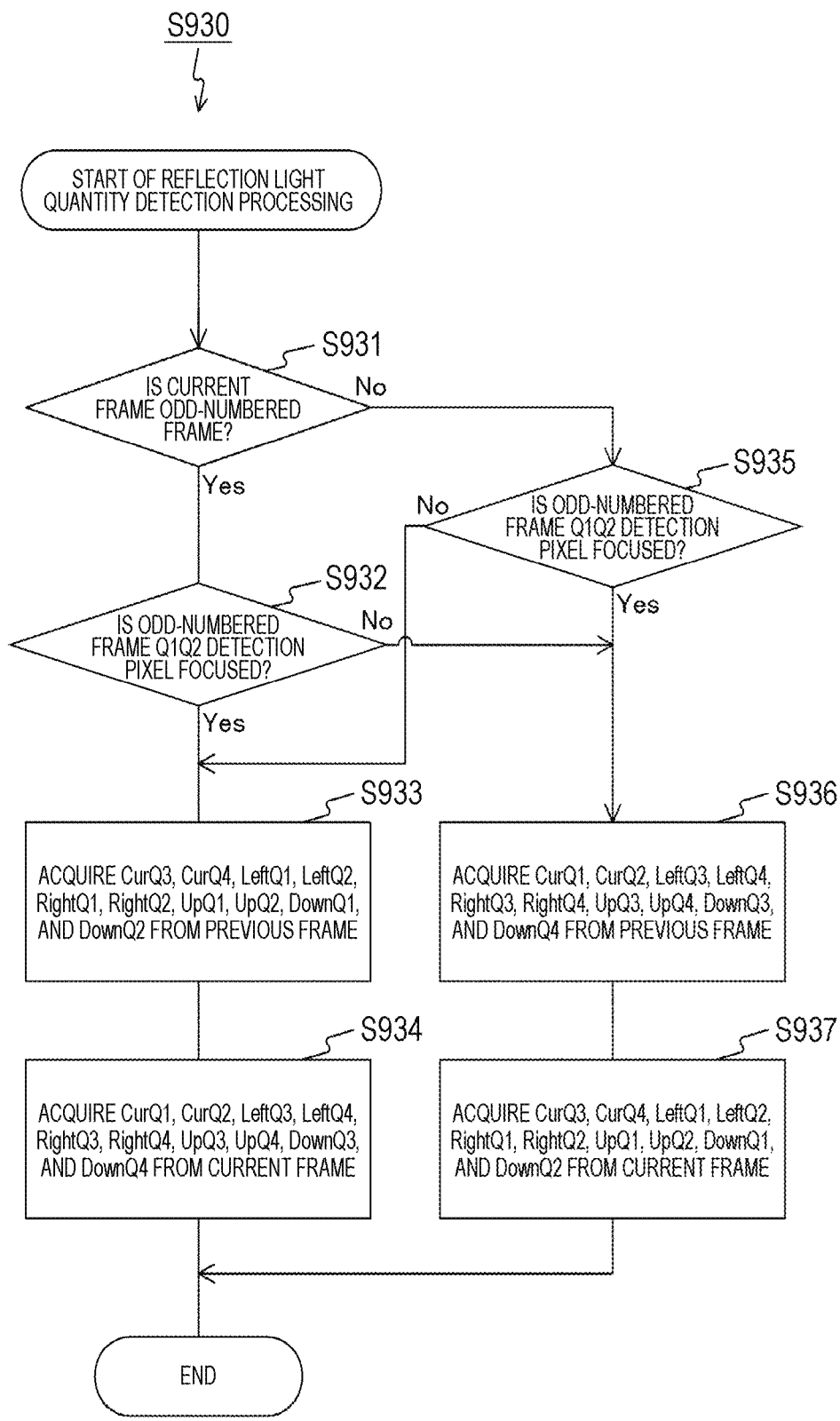
FIG. 28 is a flowchart illustrating exemplary reflection light quantity detection processing according to the second embodiment of the present technology.

FIG. 28 is a flowchart illustrating exemplary reflection light quantity detection processing according to the second embodiment. The ranging module 100 determines whether a current frame is an odd-numbered frame (step S931). In a case where the current frame is the odd-numbered frame (step S931: Yes), the ranging module 100 determines whether an odd-numbered frame Q1Q2 detection pixel is focused (step S932).

In a case where the odd-numbered frame Q1Q2 detection pixel is focused in the odd-numbered frame (step S932: Yes), the ranging module 100 acquires CurQ3 and CurQ4 from the focused pixel one frame before. Additionally, the ranging module 100 acquires LeftQ1, LeftQ2, RightQ1, RightQ2, UpQ1, UpQ2, DownQ1, and DownQ2 from pixels adjacent to the focused pixel one frame before (step S933).

Additionally, the ranging module 100 acquires, from the current frame, CurQ1, CurQ2, LeftQ3, LeftQ4, RightQ3, RightQ4, UpQ3, UpQ4, DownQ3, and DownQ4 (step S934).

Furthermore, in a case where the current frame is an even-numbered frame (step S931: No), the ranging module 100 determines whether an odd-numbered frame Q1Q2 detection pixel is focused (step S935).

In a case where the even-numbered frame Q1Q2 detection pixel is focused in the even-numbered frame (step S935: No), the ranging module 100 executes the processing from step S933. On the other hand, in a case where the odd-numbered frame Q1Q2 detection pixel is focused (step S935: Yes), the ranging module 100 acquires CurQ1 and CurQ2 from the focused pixel one frame before. Additionally, the ranging module 100 acquires LeftQ3, LeftQ4, RightQ3, RightQ4, UpQ3, UpQ4, DownQ3, and DownQ4 from pixels adjacent to the focused pixel one frame before (Step S936).

Additionally, the ranging module 100 acquires CurQ3, CurQ4, LeftQ1, LeftQ2, RightQ1, RightQ2, UpQ1, UpQ2, DownQ1, and DownQ2 from a current frame (step S937).

Furthermore, in a case where an even-numbered frame Q1Q2 detection pixel is focused in the odd-numbered frame (step S932: No), the ranging module 100 executes the processing from step S936. After performing step S934 or S937, the ranging module 100 finishes the reflection light quantity detection processing.

Figure 29:
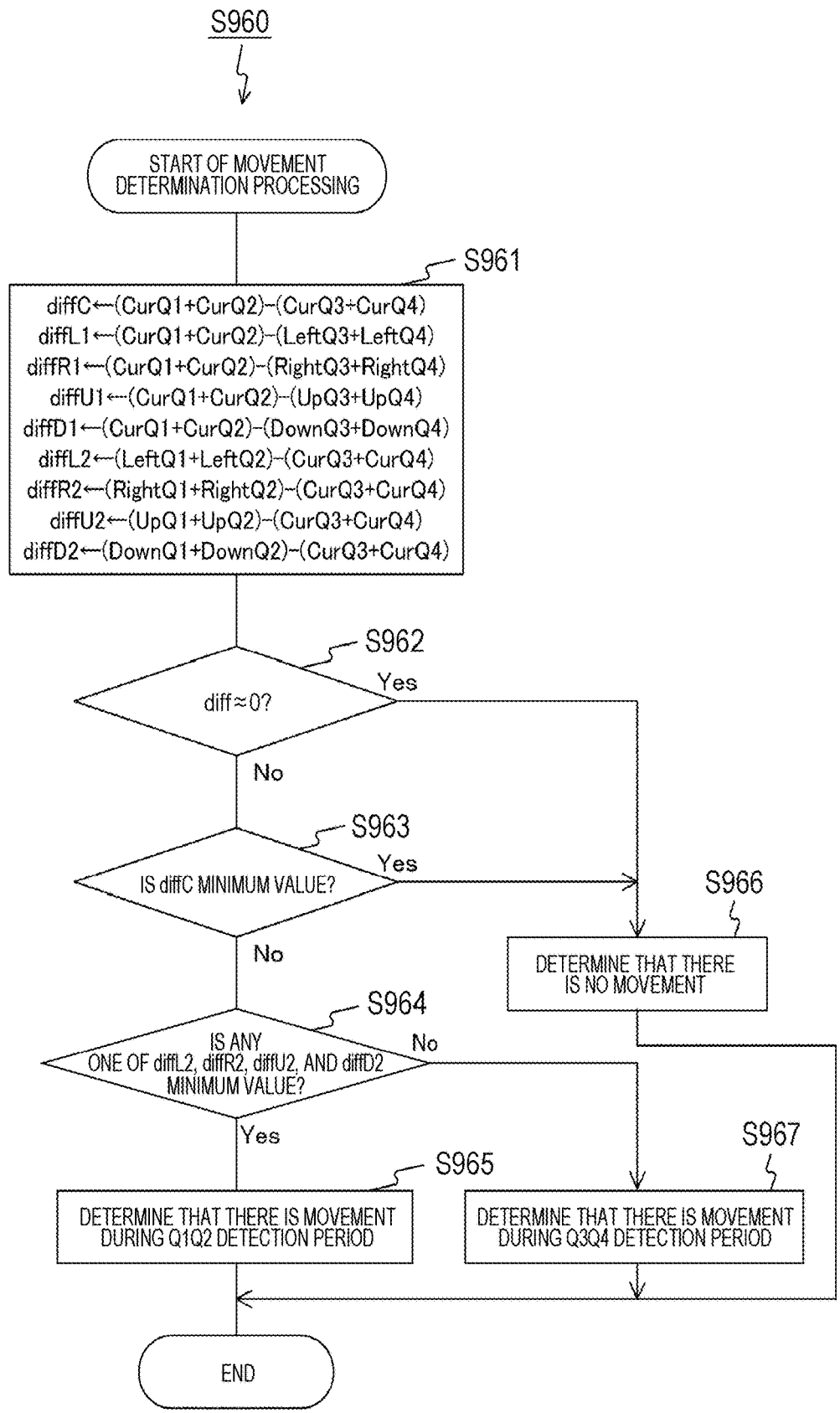
FIG. 29 is a flowchart illustrating exemplary movement determination processing according to the second embodiment of the present technology.

FIG. 29 is a flowchart illustrating exemplary movement determination processing according to the second embodiment. The ranging module 100 calculates a difference diffC and the like by using the Expression 2 and Expressions 5 to 11 (step S961).

The ranging module 100 determines whether diffC≈0 is satisfied (step S962). In a case where diffC≈0 is not satisfied (step S962: No), the ranging module 100 determines whether diffC is a minimum value (step S963). In a case of diffC≈0 is satisfied (step S962: Yes) or diffC is a minimum value (step S963: Yes), the ranging module 100 determines that an object is not moved in the focused pixel (step S966).

In a case where diffC is not the minimum value (step S963: No), the ranging module 100 determines whether any one of diffL2, diffR2, diffU2 and diffD2 is a minimum value (step S964). In a case where diffL2 or the like is the minimum value (step S964: Yes), the ranging module 100 determines that there is movement in the focused pixel during the Q1Q2 detection period (step S965). On the other hand, in a case where diffL1 or the like is the minimum value (step S964: No), the ranging module 100 determines that there is movement in the focused pixel during the Q3Q4 detection period (step S967). After step S965, S966, or S967, the ranging module 100 finishes the movement determination processing.

Figure 30:
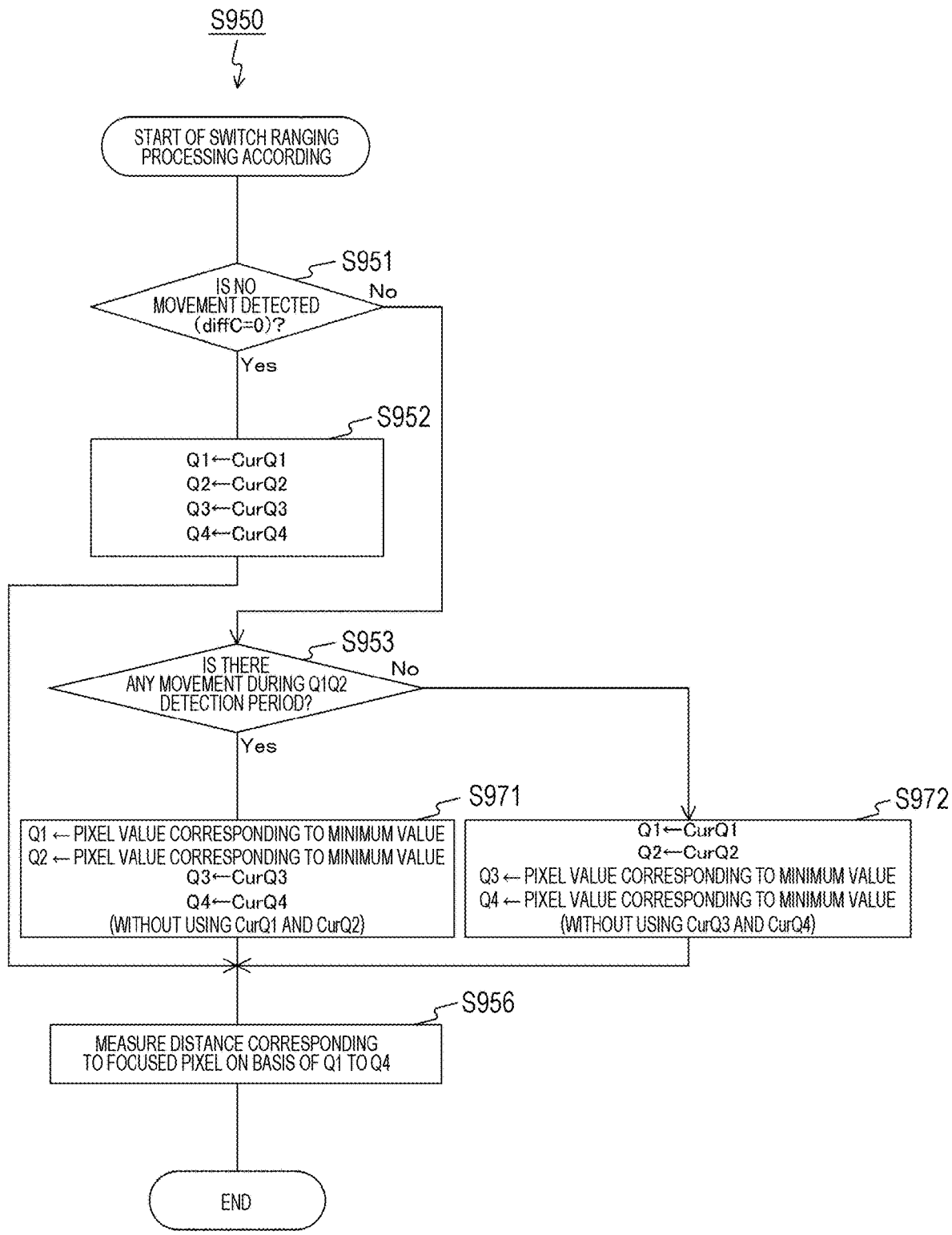
FIG. 30 is a flowchart illustrating exemplary operation of switch ranging processing according to the second embodiment of the present technology.

FIG. 30 is a flowchart illustrating exemplary operation of switch ranging processing according to the second embodiment. The switch ranging processing of the second embodiment differs from that of the first embodiment in executing steps S971 and S972 instead of steps S954 and S955.

In a case where there is any movement during the Q1Q2 detection period (step S953: Yes), the ranging module 100 substitutes received light quantities of an adjacent pixel corresponding to a minimum value of a difference, CurQ3, and CurQ4 for Q1, Q2, Q3 and Q4. CurQ1 and CurQ2 are discarded without being used for ranging (step S971).

On the other hand, in a case where there is movement during the Q3Q4 detection period (step S953: No), the ranging module 100 substitutes CurQ1, CurQ2, and received light quantities of an adjacent pixel corresponding to a minimum value of a difference for Q1, Q2, Q3, and Q4. CurQ3 and CurQ4 are discarded without being used for ranging (step S972).

Meanwhile, the ranging module 100 calculates a distance d on the basis of four received light quantities (Q1 and the like) corresponding to a minimum value out of nine differences (diffC and the like) in steps S971 and S972, but a following calculation may also be performed instead of this calculation. More specifically, the ranging module 100 obtains, as w1 to w9, weights inversely proportional to respective values of the nine differences. Then, all of nine kinds of calculations in steps S971 and S972 are executed, and results thereof are defined as distances d1 to d9. Then, the ranging module 100 calculates a weighted average between the weights w1 and the like and the distance d1 and the like, and outputs a calculation result thereof as a final distance d. In the processing exemplified in FIGS. 29 and 30, even in a case where some of the nine differences are slight differences, one of the minimum values is selected. In contrast, since the weighted average is obtained, averaging is performed even when the differences are slight, and there is an advantage of being robust against measurement noise.

Thus, according to the second embodiment of the present technology, since the ranging module 100 measures a distance on the basis of received light quantities of two kinds of pixels that detect the received light quantities at different timings, the capacity of the memory to hold the received light quantities can be reduced.

<3. Exemplary Application to Moving Object>

The technology according to the present disclosure (present technology) can be applied to various products. For example, the technology according to the present disclosure may be implemented as a device mounted on any kind of moving objects such as a car, an electric vehicle, a hybrid electric vehicle, a motorcycle, a bicycle, a personal mobility, an airplane, a drone, a ship, and a robot.

Figure 31:
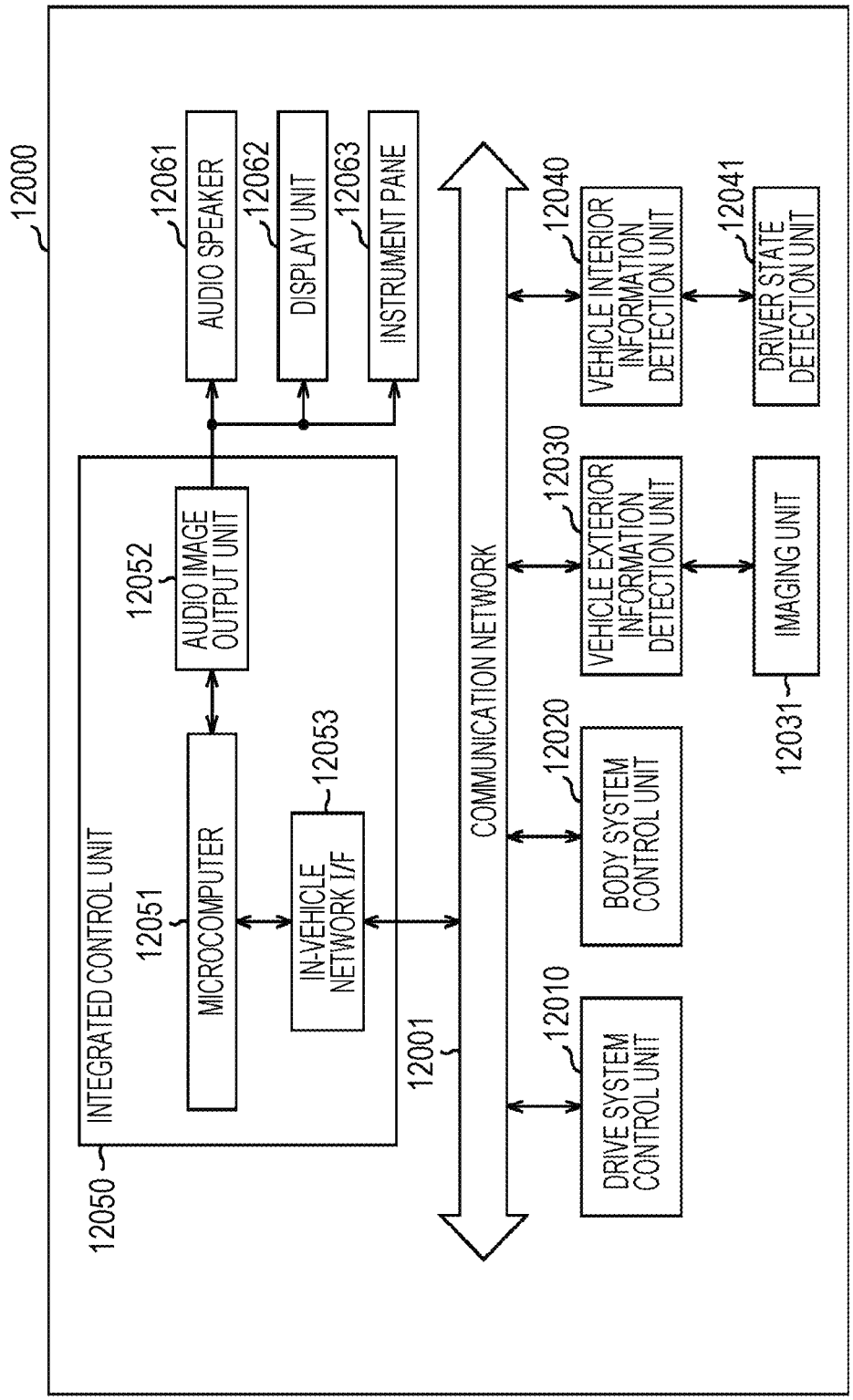
FIG. 31 is a block diagram illustrating an exemplary schematic configuration of a vehicle control system.

FIG. 31 is a block diagram illustrating a schematic exemplary configuration of a vehicle control system that is an example of a moving object control system to which the technology according to the present disclosure is applied.

The vehicle control system 12000 includes a plurality of electronic control units connected via a communication network 12001. In the example illustrated in FIG. 31, the vehicle control system 12000 includes a drive system control unit 12010, a body system control unit 12020, a vehicle exterior information detection unit 12030, a vehicle interior information detection unit 12040, and an integrated control unit 12050. Additionally, a microcomputer 12051, an audio image output unit 12052, and an in-vehicle network interface (I/F) 12053 are illustrate as functional components of the integrated control unit 12050.

The drive system control unit 12010 controls operation of devices related to the drive system of the vehicle in accordance with various kinds of programs. For example, the drive system control unit 12010 functions as a control device for a drive force generation device to generate drive force of a vehicle, such as an internal combustion engine or a drive motor, a drive force transmission mechanism to transmit drive force to wheels, a steering mechanism to adjust a steering angle of a vehicle, a braking device to generate braking force of the a vehicle, and the like.

The body system control unit 12020 controls operation of various kinds of devices mounted on a vehicle body in accordance with various kinds of programs. For example, the body system control unit 12020 functions as a keyless entry system, a smart key system, a power window device, and a control device for various kinds of lamps such as a head lamp, a back lamp, a brake lamp, a turn indicator, or a fog lamp. In this case, a radio wave transmitted from a portable device functioning as a substitute for a key, or a signal from various kinds of switches can be received in the body system control unit 12020. The body system control unit 12020 accepts input of such a radio wave or a signal, and controls a door lock device, a power window device, a lamp, and the like.

The vehicle exterior information detection unit 12030 detects information outside a vehicle mounted with the vehicle control system 12000. For example, the vehicle exterior information detection unit 12030 has an imaging unit 12031 connected. The vehicle exterior information detection unit 12030 causes the imaging unit 12031 to capture an image of the outside of the vehicle, and receives the captured image. The vehicle exterior information detection unit 12030 may perform object detection processing or distance detection processing relative to a person, a vehicle, an obstacle, a sign, a character on a road surface, or the like, on the basis of a received image.

The imaging unit 12031 is an optical sensor to receive light and output an electric signal corresponding to the received light quantity. The imaging unit 12031 can output an electric signal as an image or output the electric signal as ranging information. Additionally, light received by the imaging unit 12031 may be visible light or may be invisible light such as infrared light.

The vehicle interior information detection unit 12040 detects information inside the vehicle. For example, a driver state detection unit 12041 to detect a state of a driver is connected to the vehicle interior information detection unit 12040. The driver state detection unit 12041 includes, for example, a camera to image a driver, and the vehicle interior information detection unit 12040 may calculate a degree of fatigue or a degree of concentration of the driver on the basis of detection information received from the driver state detection unit 12041, or may determine whether the driver is dozing off.

The microcomputer 12051 calculates control target values for the drive force generation device, steering mechanism, or braking device on the basis of information related to the inside and outside of the vehicle acquired by the vehicle exterior information detection unit 12030 or the vehicle interior information detection unit 12040, and can output a control command to the drive system control unit 12010. For example, the microcomputer 12051 can perform cooperative control intended to implement functions of an advanced driver assistance system (ADAS) including: collision avoidance or impact mitigation of a vehicle; follow-up cruise based on an inter-vehicle distance; constant speed cruising, vehicle collision warning, vehicle lane departure warning, or the like.

Additionally, the microcomputer 12051 controls the drive force generation device, steering mechanism, braking device, or the like on the basis of information related to surroundings of the vehicle acquired by the vehicle exterior information detection unit 12030 or the vehicle interior information detection unit 12040, thereby achieving cooperative control intended to perform automated cruising or the like to autonomously travel without depending on operation by a driver.

Additionally, the microcomputer 12051 can output a control command to the body system control unit 12020 on the basis of the vehicle exterior information acquired by the vehicle exterior information detection unit 12030. For example, the microcomputer 12051 controls a headlamp in accordance with a position of a preceding vehicle or an oncoming vehicle detected by the vehicle exterior information detection unit 12030, and performs cooperative control intended to perform an anti-dazzle function such as switching a high beam to a low beam.

The audio image output unit 12052 transmits an output signal of at least one of audio and an image to an output device capable of providing visual or audible notification of information to a vehicle occupant or to the vehicle exterior. In the example of FIG. 31, an audio speaker 12061, a display unit 12062, and an instrument panel 12063 are illustrated as such output devices. The display unit 12062 may include at least one of an on-board display and a head-up display, for example.

Figure 32:
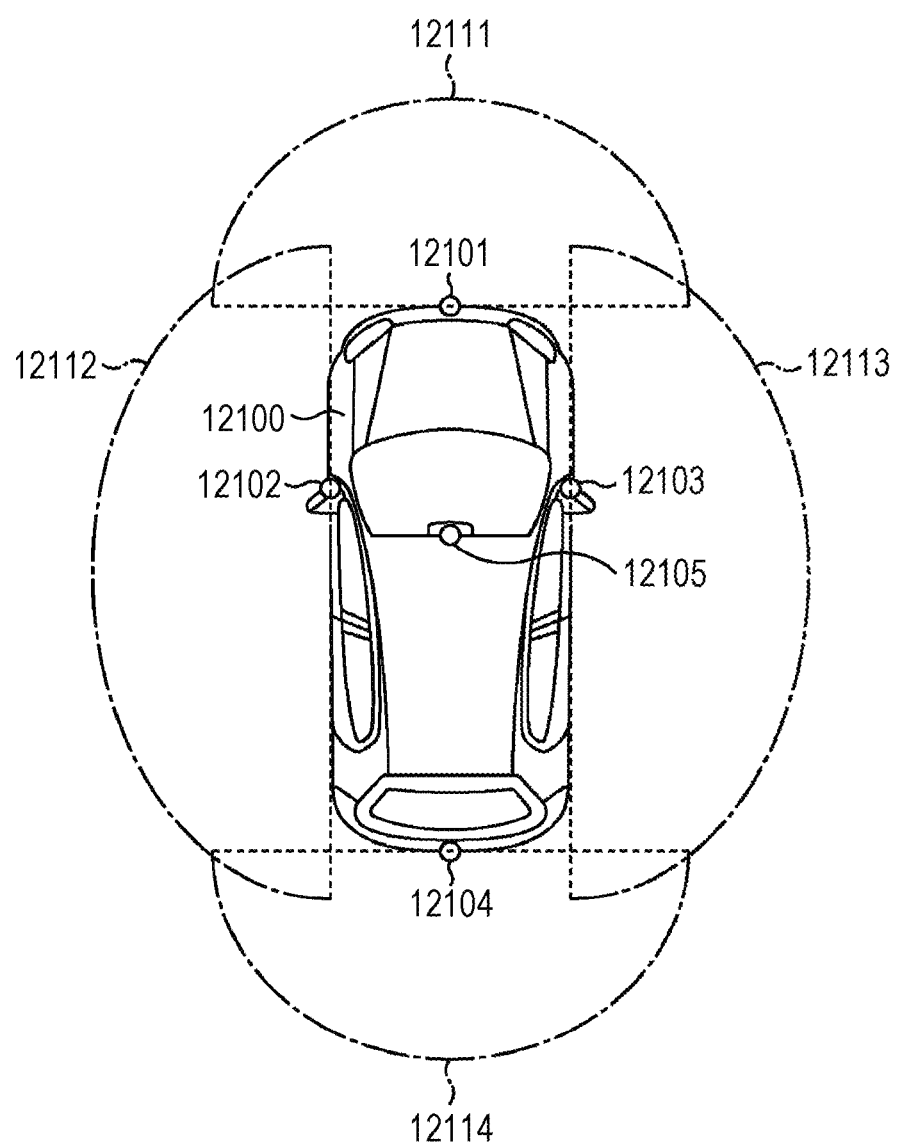
FIG. 32 is an explanatory diagram illustrating exemplary installing positions of a vehicle exterior information detection unit and an imaging unit.

FIG. 32 is a diagram illustrating an exemplary installing position of the imaging unit 12031.

In FIG. 32, imaging units 12101, 12102, 12103, 12104, and 12105 are included as the imaging units 12031.

For example, the imaging units 12101, 12102, 12103, 12104, and 12105 are provided at positions such as a front nose, a side mirror, a rear bumper, a back door, and an upper portion of a front windshield inside a vehicle interior of a vehicle 12100. The imaging unit 12101 provided at the front nose and the imaging unit 12105 provided at the upper portion of the front windshield inside the vehicle interior mainly capture images ahead of the vehicle 12100. The imaging units 12102 and 12103 provided at the side mirrors mainly capture side images of the vehicle 12100. The imaging unit 12104 provided at the rear bumper or the back door mainly capture an image behind the vehicle 12100. The imaging unit 12105 provided at the upper portion of the front windshield in the vehicle interior is mainly used to detect a preceding vehicle, a pedestrian, an obstacle, a traffic signal, a traffic sign, a lane, or the like.

Note that FIG. 32 illustrates exemplary imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the respective side mirrors, and an imaging range 12114 indicates an imaging range of the imaging unit 12104 provided at the rear bumper or the back door. For example, an overhead view image of the vehicle 12100 viewed from above can be obtained by overlapping pieces of image data captured by the imaging units 12101 to 12104.

At least one of the imaging units 12101 to 12104 may have a function to acquire distance information. For example, at least one of the imaging units 12101 to 12104 may be a stereo camera including a plurality of imaging devices, or may be an imaging device having a pixel to detect a phase difference.

For example, the microcomputer 12051 obtains a distance to each three-dimensional object within the imaging ranges 12111 to 12114 and temporal change of the distance (relative speed with respect to the vehicle 12100) on the basis of distance information obtained from the imaging units 12101 to 12104, thereby extracting, as a preceding vehicle, a closest three-dimensional object existing on a traveling route of the vehicle 12100 and the three-dimensional object traveling in a direction substantially same as the vehicle 12100 at a predetermined speed (e.g., 0 km/h or more). Additionally, the microcomputer 12051 can preliminarily set an inter-vehicle distance to be secured in a space ahead with a preceding vehicle, and can perform automatic brake control (including follow-up cruising stop control), automatic acceleration control (follow-up cruising start control), and the like. Thus, it is possible to perform cooperative control intended to perform automated cruising or the like to autonomously travel without depending on operation of a driver.

For example, the microcomputer 12051 categorizes three-dimensional object data related to a three-dimensional object into three-dimensional objects such as a two-wheeled vehicle, a regular vehicle, a large vehicle, a pedestrian, a telephone pole, and the like on the basis of distance information obtained from the imaging units 12101 to 12104, extracts the categorized objects, and uses the same to automatically avoid obstacles. For example, the microcomputer 12051 identifies an obstacle in the vicinity of the vehicle 12100 as an obstacle that can be visible or an obstacle that can be hardly visible by the driver of the vehicle 12100. Then, the microcomputer 12051 determines a collision risk indicating a risk level of collision with each of the obstacles, and when the collision risk is a setting value or higher and collision may occur, the microcomputer 12051 can provide operation assistance in order to avoid collision by outputting an alarm to the driver via the audio speaker 12061 and the display unit 12062, or by performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether a pedestrian exists inside captured images of the imaging units 12101 to 12104. Such recognition for a pedestrian is performed by, for example: a procedure to extract feature points from the captured images of the imaging units 12101 to 12104 functioning as infrared cameras; and a procedure to apply pattern matching processing to a series of feature points indicating an outline of an object and determine whether the object is a pedestrian. When the microcomputer 12051 determines that a pedestrian exists inside the captured images of the imaging units 12101 to 12104 and recognizes the pedestrian, the audio image output unit 12052 controls the display unit 12062 so as to display a rectangular contour line over the recognized pedestrian in a superimposed manner for emphasis. Furthermore, the audio image output unit 12052 may also control the display unit 12062 so as to display an icon or the like indicating the pedestrian at a desired position.

The exemplary vehicle control system to which the technology according to the present disclosure can be applied has been described above. The technology according to the present disclosure can be applied to, for example, the vehicle exterior information detection unit 12030 among the components described above. More specifically, the ranging module 100 of FIG. 1 can be provided inside the vehicle exterior information detection unit 12030 of FIG. 31. Since the technology according to the present disclosure is applied, a distance to an object in the vicinity of a vehicle can be measured more accurately.

Note that the above-described embodiments are described as the examples to embody the present technology, and the matters in the embodiments and matters specifying the invention recited in the claims have corresponding relations, respectively. Similarly, the matters specifying the invention recited in the claims and the matters recited in the embodiments of the present technology assigned with the same names have corresponding relation, respectively. However, the present technology is not limited to these embodiments, and can be embodied by applying various modification to the embodiments without departing from the gist thereof.

Furthermore, the processing procedure described in the above embodiments may be regarded as a method having the series of procedures, and also may be regarded as a program to cause a computer to execute the series of procedures or as a recording medium to store the program. As the recording medium, for example, a compact disc (CD), a mini disc (MD), a digital versatile disc (DVD), a memory card, a Blu-ray disc (Blu-ray (registered trademark) Disc), or the like can be used.

Note that the effects recited herein are not constantly limited thereto and may be any one of those recited in the present disclosure.

Note that the present technology may also adopt the following configurations.

(1) A ranging module including:

a light receiving unit adapted to receive reflection light from an object and detect a received light quantity of the reflection light within a predetermined detection period every time the predetermined detection period elapses;

a determination unit adapted to determine whether the object is moved during each of the predetermined detection periods; and a ranging unit adapted to measure a distance to the object on the basis of the received light quantity within the predetermined detection period during which it is determined that the object is not moved.

(2) The ranging module recited in (1) above, in which the predetermined detection period includes a first and second detection periods different from each other, the light receiving unit receives the reflection light and detects first and second received light quantities over predetermined light receiving periods from first and second light reception start timings out of first, second, third, and fourth light reception start timings different from each other during the first detection period, and the light receiving unit receives the reflection light and detects third and fourth received light quantities over the predetermined light receiving periods from the third and fourth light reception start timings during the second detection period, and the ranging unit measures the distance on the basis of a ratio of a difference between the first and second received light quantities to a difference between the third and fourth received light quantities.

(3) The ranging module recited in (2) above, further including:

a first delay unit adapted to delay the first and second received light quantities and output the delayed first and second received light quantities as first and second current received light quantities;

a second delay unit adapted to delay the third and fourth received light quantities and output the delayed third and fourth received light quantities as third and fourth current received light quantities; and a third delay unit adapted to delay the third and fourth current received light quantities and output the delayed third and fourth current received light quantities as third and fourth preceding received light quantities, in which the determination unit determines whether the object is moved during any one of the first and second detection periods on the basis of a difference between a sum of the first and second current received light quantities and a sum of the third and fourth current received light quantities.

(4) The ranging module recited in (3) above, in which in a case of determining that the object is moved during any one of the first and second detection periods, the determination unit determines whether the object is moved during the first detection period on the basis of a difference between a sum of third and fourth preceding received light quantities and the sum of the first and second current received light quantities, and in the case where it is determined that the object is moved during the first detection period, the ranging unit measures the distance on the basis of a ratio of a difference between the third and fourth current received light quantities to a difference between the first and second received light quantities next to the first and second current received light quantities.

(5) The ranging module recited in (3) or (4) above, in which in a case of determining that the object is moved during any one of the first and second detection periods, the determination unit determines whether the object is moved during the second detection period on the basis of a difference between a sum of the first and second received light quantities next to the first and second current received light quantities and the sum of the third and fourth current received light quantities, and in a case where it is determined that the object is moved during the second detection period, the ranging unit measures the distance on the basis of a ratio of a difference between the first and second preceding received light quantities to a difference between the first and second current received light quantities.

(6) The ranging module recited in (3) above, further including:

a fourth delay unit adapted to delay the first and second received light quantities and output the delayed first and second received light quantities to the first delay unit as next first and second received light quantities; and a fifth delay unit adapted to delay the first and second current received light quantities and output the delayed first and second current received light quantities as first and second preceding received light quantities.

(7) The ranging module recited in (6) above, in which in a case of determining that the object is moved during any one of the first and second detection periods, the determination unit determines whether the object is moved during the second detection period on the basis of a difference between a sum of the first and second preceding received light quantities and a sum of the third and fourth current received light quantities, and in a case where it is determined that the object is moved during the second detection period, the ranging unit measures the distance on the basis of a ratio of a difference between first and second statistics to a difference between third and fourth preceding received light quantities while defining, as the first statistic, a statistic of the first preceding received light quantity and the first current received light quantity and further defining, as the second statistic, a statistic of the second preceding received light quantity and the second current received light quantity.

(8) The ranging module recited in (6) or (7) above, in which in a case of determining that the object is moved during any one of the first and second detection periods, the determination unit determines whether the object is moved during the first detection period on the basis of a difference between a sum of the third and fourth preceding received light quantities and the sum of the first and second current received light quantities, and in the case where it is determined that the object is moved during the first detection period, the ranging unit measures the distance on the basis of a ratio of a difference between third and fourth statistics to a difference between the next first and second received light quantities while defining, as the third statistic, a statistic of the third current received light quantity and the next third received light quantity and further defining, as the fourth statistic, a statistic of the fourth current received light quantity and the next fourth received light quantity.

(9) The ranging module according to claim 1, the light receiving unit including:

a first pixel adapted to receive the light receiving unit the reflection light and detect first and second received light quantities over predetermined light receiving periods from first and second light reception start timings out of first, second, third, and fourth light reception start timings different from each other during an odd-number-th predetermined detection period, and adapted to receive the reflection light and detect third and fourth received light quantities over predetermined light receiving periods from the third and fourth light reception start timings during an even-number-th predetermined detection period; and a second pixel adapted to receive the reflection light and detect third and fourth received light quantities over predetermined light receiving periods from the third and fourth light reception start timings during an odd-number-th predetermined detection period, and adapted to receive the reflection light and detect first and second received light quantities over the predetermined light receiving periods from the first and second light reception start timings during an even-number-th predetermined detection period, in which the ranging unit measures the distance on the basis of a ratio of the difference between the first and second received light quantities to the difference between the third and fourth received light quantities.

(10) The ranging module recited in (9) above, in which the determination unit determines whether the object is moved on the basis of a difference between a sum of the first and second received light quantities and a sum of the third and fourth received light quantities in a focused pixel focused out of the first and second pixels.

(11) The ranging module recited in (10) above, in which in a case where it is determined that the object is moved, the ranging unit measures the distance on the basis of a ratio of a difference between received light quantities in the focused pixel to a difference between received light quantities in an adjacent pixel adjacent to the focused pixel out of the first and second pixels.

(12) The ranging module according to any one of (1) to (11) above, further including a light emitting unit adapted to irradiate the object with irradiation light.

(13) A ranging system including:
a light emitting unit adapted to irradiate an object with irradiation light;
a light receiving unit adapted to receive reflection light from the object and detect a received light quantity of the reflection light within a predetermined detection period every time the predetermined detection period elapses;
a determination unit adapted to determine whether the object is moved during each of the predetermined detection periods; and
a ranging unit adapted to measure a distance to the object on the basis of the received light quantity within the predetermined detection period during which it is determined that the object is not moved.

(14) The ranging system recited in (13) above, further including an imaging unit adapted to capture image data every time the predetermined detection period elapses,
in which the determination unit determines whether the object is moved on the basis of the image data.

(15) A control method for a ranging module, including:
a light receiving procedure of receiving reflection light from an object and detecting a received light quantity of the reflection light within a predetermined detection period every time the predetermined detection period elapses;
a determination procedure of determining whether the object is moved during each of the predetermined detection periods; and
a ranging procedure of performing ranging to measure a distance to the object on the basis of the received light quantity within the predetermined detection period during which it is determined that the object is not moved.

REFERENCE SIGNS LIST

100 Ranging module
110 Light emitting unit
120 Light emission control unit
200 Light receiving unit
210 Row scanning circuit
220 Pixel array unit
230 Pixel circuit
231 Light receiving element
232 Transfer switch
233, 234 Electric charge accumulation unit
235, 236 Selection switch
240 Timing control unit
250 AD conversion unit
260 Column scanning circuit
270 Signal processing unit
300 Ranging calculation unit
310 Switch output unit
320, 330, 340, 370, 380 Frame memory
350, 351 Movement determination unit
360, 361, 362 Switch ranging calculation unit
390 Line memory
400 Imaging module
410 Imaging device
420 Moving object detection unit

The invention claimed is:

1. A ranging module, comprising:
a light receiving unit configured to receive reflection light from an object and detect a received light quantity of the reflection light within a predetermined detection period every time the predetermined detection period elapses, wherein the predetermined detection period includes a first and second detection periods different from each other, and the light receiving unit receives the reflection light and detects first and second received light quantities over predetermined light receiving periods from first and second light reception start timings out of first, second, third, and fourth light reception start timings different from each other during the first detection period, and the light receiving unit receives the reflection light and detects third and fourth received light quantities over the predetermined light receiving periods from the third and fourth light reception start timings during the second detection period;
a determination unit configured to determine whether the object is moved during each of the predetermined detection periods;
a ranging unit configured to measure a distance to the object on the basis of the received light quantity within the predetermined detection period during which it is determined that the object is not moved, wherein the ranging unit is configured to measure the distance on the basis of a ratio of a difference between the first and second received light quantities to a difference between the third and fourth received light quantities;
a first delay unit configured to delay the first and second received light quantities and output the delayed first and second received light quantities as first and second current received light quantities;
a second delay unit configured to delay the third and fourth received light quantities and output the delayed third and fourth received light quantities as third and fourth current received light quantities; and
a third delay unit configured to delay the third and fourth current received light quantities and output the delayed third and fourth current received light quantities as third and fourth preceding received light quantities,
wherein the determination unit is configured to determine whether the object is moved during any one of the first and second detection periods on the basis of a difference between a sum of the first and second current received light quantities and a sum of the third and fourth current received light quantities.

2. The ranging module according to claim 1, wherein
in a case of determining that the object is moved during any one of the first and second detection periods, the determination unit determines whether the object is moved during the first detection period on the basis of a difference between a sum of third and fourth preceding received light quantities and the sum of the first and second current received light quantities, and
in the case where it is determined that the object is moved during the first detection period, the ranging unit measures the distance on the basis of a ratio of a difference between the third and fourth current received light quantities to a difference between the first and second received light quantities next to the first and second current received light quantities.

3. The ranging module according to claim 1, wherein
in a case of determining that the object is moved during any one of the first and second detection periods, the determination unit determines whether the object is moved during the second detection period on the basis of a difference between a sum of the first and second received light quantities next to the first and second current received light quantities and the sum of the third and fourth current received light quantities, and
in a case where it is determined that the object is moved during the second detection period, the ranging unit measures the distance on the basis of a ratio of a difference between the first and second preceding received light quantities to a difference between the first and second current received light quantities.

4. The ranging module according to claim 1, further comprising:
a fourth delay unit configured to delay the first and second received light quantities and output the delayed first and second received light quantities to the first delay unit as next first and second received light quantities; and
a fifth delay unit configured to delay the first and second current received light quantities and output the delayed first and second current received light quantities as first and second preceding received light quantities.

5. The ranging module according to claim 4, wherein
in a case of determining that the object is moved during any one of the first and second detection periods, the determination unit determines whether the object is moved during the second detection period on the basis of a difference between a sum of the first and second preceding received light quantities and a sum of the third and fourth current received light quantities, and
in a case where it is determined that the object is moved during the second detection period, the ranging unit measures the distance on the basis of a ratio of a difference between first and second statistics to a difference between third and fourth preceding received light quantities while defining, as the first statistic, a statistic of the first preceding received light quantity and the first current received light quantity and further defining, as the second statistic, a statistic of the second preceding received light quantity and the second current received light quantity.

6. The ranging module according to claim 4, wherein
in a case of determining that the object is moved during any one of the first and second detection periods, the determination unit determines whether the object is moved during the first detection period on the basis of a difference between a sum of the third and fourth preceding received light quantities and the sum of the first and second current received light quantities, and
in the case where it is determined that the object is moved during the first detection period, the ranging unit measures the distance on the basis of a ratio of a difference between third and fourth statistics to a difference between the next first and second received light quantities while defining, as the third statistic, a statistic of the third current received light quantity and the next third received light quantity and further defining, as the fourth statistic, a statistic of the fourth current received light quantity and the next fourth received light quantity.

* * * * *